(12) United States Patent
Newton et al.

(10) Patent No.: US 9,292,940 B2
(45) Date of Patent: Mar. 22, 2016

(54) METHOD AND APPARATUS FOR GENERATING AN IMAGE CODING SIGNAL

(75) Inventors: Philip Steven Newton, Eindhoven (NL); Wiebe De Haan, Eindhoven (NL); Mark Jozef Willem Mertens, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 175 days.

(21) Appl. No.: 14/112,273

(22) PCT Filed: Apr. 17, 2012

(86) PCT No.: PCT/IB2012/051913
§ 371 (c)(1),
(2), (4) Date: Oct. 17, 2013

(87) PCT Pub. No.: WO2012/147010
PCT Pub. Date: Nov. 1, 2012

(65) Prior Publication Data
US 2014/0037206 A1    Feb. 6, 2014

(30) Foreign Application Priority Data

Apr. 28, 2011 (EP) .................................. 11164002

(51) Int. Cl.
*G06K 9/36* (2006.01)
*G06T 9/00* (2006.01)
(Continued)

(52) U.S. Cl.
CPC .............. *G06T 9/004* (2013.01); *G06T 5/009* (2013.01); *H04N 1/646* (2013.01); *H04N 19/184* (2014.11);
(Continued)

(58) Field of Classification Search
CPC ............ G06T 9/004; G06T 5/009; G06T 2207/10024; H04N 1/646; H04N 19/597; H04N 19/70; H04N 19/46; H04N 19/30; H04N 19/61; H04N 19/186; H04N 19/184; H04N 19/187

USPC ........................................... 382/166, 232–233
See application file for complete search history.

(56) References Cited

U.S. PATENT DOCUMENTS 8,050,511 B2 * 11/2011 Daly et al. ..................... 382/274
8,665,942 B2 *  3/2014 Segall ........................... 375/240
(Continued)

FOREIGN PATENT DOCUMENTS

| EP | 1827024 A1 | 8/2007 |
|---|---|---|
| WO | WO2010105036 A1 | 9/2010 |
| WO | WO2011037933 A1 | 3/2011 |

OTHER PUBLICATIONS

"scRGB", from Wikipedia, Jan. 11, 2010 http://en.wikipedia.org/wiki/ScRGB.
(Continued)

*Primary Examiner* — Kanjibhai Patel
(74) *Attorney, Agent, or Firm* — Larry Liberchuk

(57) ABSTRACT

An apparatus generates an image coding signal comprising for each image a first pixelized picture and a second pixelized picture having a luminance component and a chroma component. The apparatus comprises a first picture processor (203, 211) which includes image encoding data for an encoded first image in the first pixelized picture. A second picture processor (205, 207, 209, 211) includes dynamic range extension data in the second pixelized picture. The dynamic range extension data may be dynamic range extension data included in a chroma component of the second pixelized picture for generating an increased dynamic range image on the basis of the encoded first image. The compensation data may e.g. be compensation data for correcting another LDR-to-HDR transform, e.g. a prefixed global gamma transformation. The dynamic range extension data may be included in a luminance component and comprise data representing a dynamic range extension transform for generating an increased dynamic range image from the encoded first image.

17 Claims, 14 Drawing Sheets

(51) Int. Cl.
*H04N 1/64* (2006.01)
*H04N 19/597* (2014.01)
*H04N 19/70* (2014.01)
*H04N 19/46* (2014.01)
*H04N 19/30* (2014.01)
*H04N 19/61* (2014.01)
*H04N 19/186* (2014.01)
*H04N 19/184* (2014.01)
*H04N 19/187* (2014.01)
*G06T 5/00* (2006.01)

(52) U.S. Cl.
CPC ........... *H04N 19/186* (2014.11); *H04N 19/187* (2014.11); *H04N 19/30* (2014.11); *H04N 19/46* (2014.11); *H04N 19/597* (2014.11); *H04N 19/61* (2014.11); *H04N 19/70* (2014.11); *G06T 2207/10024* (2013.01)

(56) References Cited

U.S. PATENT DOCUMENTS

| | | | |
|---|---|---|---|
| 8,880,571 B2* | 11/2014 | Srinivasan et al. | 708/200 |
| 2004/0105582 A1* | 6/2004 | Boesten et al. | 382/170 |
| 2008/0310501 A1* | 12/2008 | Ward et al. | 375/240.02 |
| 2009/0015662 A1 | 1/2009 | Kim | |
| 2009/0046207 A1* | 2/2009 | Salvucci | 348/663 |
| 2009/0175338 A1 | 7/2009 | Segall | |
| 2009/0322800 A1 | 12/2009 | Atkins | |

OTHER PUBLICATIONS

"RGBE image Format", from Wikipedia, Feb. 11, 2010.

"High-Definition Multimedia Interface Specification Version 1.4a", Mar. 4, 2010, HDMI Licensing, LLC.

"Half Precision Floating-Point Format", from Wikipedia, Feb. 11, 2010 http://en.wikipedia.org/wiki/Half_precision.

"Sony Global—Technology—xvYCC, Extended-Gamut Color Space for Video Applications", Jan. 11, 2010 http://www.sony.net/SonyInfo/technology/technology/theme/xvycc_01.html.

"Color Depth", from Wikipedia, Feb. 11, 2010 http://en.wikipedia.org/wiki/Color_depth.

CEA Standard, "A DTV Profile for Uncompressed High Speed Digital Interfaces", CEA 861-D, Jul. 2006 Copyrighted may not be reproduced w/o permission.

"Display Port", from Wikipedia, Feb. 11, 2010, pp. 1-10 http://en.wikipedia.org/wiki/Displayport.

* cited by examiner

|   |   |   |   |   |   |   |   |
|---|---|---|---|---|---|---|---|
|   |   |   |   |   |   |   |   |
|   |   |   | 1 | 1 |   |   |   |
|   |   | 1 | 2 | 2 | 1 |   |   |
|   | 1 | 2 | 3 | 3 | 2 | 1 |   |
|   | 1 | 2 | 4 | 4 | 3 | 1 |   |
|   | 1 | 3 | 5 | 5 | 4 | 3 |   |
|   | 1 | 3 | 4 | 5 | 4 | 3 |   |
|   |   | 1 | 3 | 4 | 2 |   |   |
|   |   |   | 2 | 2 |   |   |   |
|   |   |   |   |   |   |   |   |
|   |   |   |   |   |   |   |   |

FIG. 6

METHOD AND APPARATUS FOR GENERATING AN IMAGE CODING SIGNAL

FIELD OF THE INVENTION

The invention relates to a method and apparatus for generating an image coding signal, and in particular, but not exclusively, to generation of an image coding signal comprising a representation of both a Low Dynamic Range (LDR) image and a High Dynamic Range (HDR) image.

BACKGROUND OF THE INVENTION

Digital encoding of various source signals has become increasingly important over the last decades as digital signal representation and communication increasingly has replaced analogue representation and communication. Continuous research and development is ongoing in how to improve the quality that can be obtained from encoded images and video sequences while at the same time keeping the data rate to acceptable levels.

An important factor for perceived image quality is the dynamic range that can be reproduced when an image is displayed. However, conventionally, the dynamic range of reproduced images has tended to be substantially reduced in relation to normal vision. Indeed, luminance levels encountered in the real world span a dynamic range as large as 14 orders of magnitude, varying from a moonless night to staring directly into the sun. Instantaneous luminance dynamic range and the corresponding human visual system response can fall between 10.000:1 and 100.000:1 on sunny days or at night (bright reflections versus dark shadow regions). Traditionally, dynamic range of displays has been confined to about 2-3 orders of magnitude, and also sensors had a limited range, e.g. <10.000:1 depending on noise acceptability. Consequently, it has traditionally been possible to store and transmit images in 8-bit gamma-encoded formats without introducing perceptually noticeable artifacts on traditional rendering devices. However, in an effort to record more precise and livelier imagery, novel High Dynamic Range (HDR) image sensors that are capable of recording dynamic ranges of more than 6 orders of magnitude have been developed. Moreover, most special effects, computer graphics enhancement and other post-production work are already routinely conducted at higher bit depths and with higher dynamic ranges.

Furthermore, the contrast and peak luminance of state-of-the-art display systems continues to increase. Recently, new prototype displays have been presented with a peak luminance as high as 3000 Cd/m$^2$ and contrast ratios of 5-6 orders of magnitude (display native, the viewing environment will also affect the finally rendered contrast ratio, which may for daytime television viewing even drop below 50:1). It is expected that future displays will be able to provide even higher dynamic ranges and specifically higher peak luminances and contrast ratios. When traditionally encoded 8-bit signals are displayed on such displays, annoying quantization and clipping artifacts may appear. Moreover, traditional video formats offer insufficient headroom and accuracy to convey the rich information contained in new HDR imagery.

As a result, there is a growing need for new approaches that allow a consumer to fully benefit from the capabilities of state-of-the-art (and future) sensors and display systems. Preferably, representations of such additional information are backwards-compatible such that legacy equipment can still receive ordinary video streams, while new HDR-enabled devices can take full advantage of the additional information conveyed by the new format. Thus, it is desirable that encoded video data not only represents HDR images but also allow encoding of the corresponding traditional Low Dynamic Range (LDR) images that can be displayed on conventional equipment.

The most straightforward approach would be to compress and store LDR and HDR streams independently of each-other (simulcast). However, this would result in a high data rate.

Therefore, a critical issue for the introduction of increased dynamic range video and images is how to effectively encode, represent, store and distribute the associated information. In particular it is desirable that backwards compatibility is maintained. Also efficiency in terms of data rate and processing complexity is significant. Another critical issue is of course the resulting image quality.

Hence, an improved approach for representing increased dynamic range images would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a method of generating an image coding signal comprising [for each image time instant (in case a video sequence is encoded), and there may be further image enumeration variables such as camera angle, focus stack number, etc.] a first pixelised picture encoding and a second pixelised picture encoding having a luminance component and at least one color component; the method comprising: including image encoding data for an encoded first image in the first pixelised picture; and including dynamic range extension data in the at least one color component (e.g. chrominance Cr as a two-dimensional set of data words of e.g. 8 bit, which correspond to pixel locations through a geometric allocation such as e.g. zigzag scan, or a more complicated mapping of sets of pixels to data words, we will also use the similar wording chroma in the rest of the text) of the second pixelised picture, the dynamic range extension data comprising data representing how to transform by a dynamic range extension transform the encoded first image into an increased dynamic range image such as e.g. an (approximation of) a HDR image of the original captured scene. I.e. for pixels or a region (e.g. the transformation could be applied in a mathematical transform space like a DCT or texture representation) there is a way to relate a high dynamic range image to a low dynamic range image by a transformation (which may be prefixed, e.g. selected per image from a limited set of transformations, or supplied as a specific transformation for each region, etc.), and with this transformation is associated further specific data (at least one numerical value), e.g. for fine-tuning or optimizing the transformation, etc. (any modification of a presupposed transformation may do), called compensation data. For simplicity we may think of e.g. a linear scaling of the LDR pixel luminance values, with e.g. a variable being the scaling factor, which may vary for different regions of the image, but of course more complex transformations may be encoded, e.g. non-linear functions being represented by the slopes of a multilinear approximation.

We like to emphasize because of the specifics of this invention that there are several terms which shouldn't be confused. Firstly there is the original scene to be represented, e.g. captured by a camera, or calculated by a computer graphics apparatus. We use the term "image" for a certain actual representation of a scene, as a matter of speaking a "physical" representation thereof. There may be various ways to represent the same scene (e.g. an instant of time in a video sequence), e.g. one may image it with two cameras with different perspective on the scene (in which case we may obtain e.g. a left and right view, i.e. the images encoding differences in the geometric encoding of the scene properties), or the two views may have a different representation of the scene object surface texture properties or in other words how light interacts with the objects as seen by the camera (which may result in images with a different representation accuracy, a different color space, or a specific desired look resulting from a different grading even possibly of the same captured original image, etc.). We contrast this with the term "picture", which is reserved for the mathematical characterization of any such picture, the place-holder as a matter of speaking We like to emphasize that we are talking about image signals (signal being the totality of what needs to be encoded to enable decoding, i.e. e.g. including metadata like frame rate, or a specification of to which actually to be rendered luminance from a display a particular luminance or luma code word corresponds) in which there are at least TWO images or "views" co-encoded together in that signal (e.g. for video there may be two picture place holders for two views of the scene at the same capturing time), which we call the first and second picture encoding. Note that the skilled person will understand what such an encoding may look like, and it need not necessarily (although it may typically be so) be a "compressed" encoding like the DCT of MPEG standards. E.g. it may be a set of code words, one 8 bit word encoding a luminance per pixel position in a two-dimensional picture, and color words in the color component, etc. I.e., it may be any RAW encoding of a two-dimensional color image, or a DCT-based encoding, e.g. like according to any prescription of the MPEG2 or AVC or HEVC compression standard. A view in the art of image coding is usually interpreted as related to a camera or camera angle, however, one can interpret view also as e.g. different renderings of the same capturing, e.g. a different artistic grading or colorimetric transformation. Note that we will use encoding both in its verb and noun meaning (e.g. an image encoding may be a JPEG DCT representation of that particular image), which difference should be very clear to anybody reading the present text with the knowledge of the image encoding skilled person. Note that using the terminology of the image is useful when pixel positions are needed, because those will typically be normal sampling pixels positions, whereas a picture may also have pixel positions, but the may correspond to various other pixel positions in the image via e.g. the DCT basis functions. As long as for at least some of the pixels of the images the transformation e.g. error compensation values can be derived on the basis of the words in the pictures, one can apply the methods. Of course this is always possible through the definitions of what is written exactly where in the picture encodings, e.g. when interpolation schemes are used to create the final values in case of sparse encodings (illumination effects need not be very precise, since the image processing can use object alignment structures like object-property conditioned non-linear adaptive filters).

Now the surprising thing is that since we have two views, or more precisely, the place holders available for encoding two views, we need not necessarily encode those in the same way. The first image/picture may be classically encoded, e.g. an MPEG2 8-bit encoding of a standard camera capturing, as is done usually in LDR image encoding. However, if the second picture is e.g. a different colorimetric representation of the same capturing geometry (in particular, with higher luminance dynamic range) or alternatively a second geometrical view, one may imagine that the encoding of image object colors is no longer needed for the second image/view, because it is already sufficiently present in the first picture encoding (as chromaticities are largely luminance independent object properties, for a 3D left/right encoding one may understand one may use colocation algorithms to map the colors from the left view objects onto the right view objects which are defined and encoded through their luminance component solely). This leaves typically two chrominance picture components for the second picture encoding free to be re-used, namely for encoding data that can be used to relate the LDR picture to a HDR picture of the captured scene.

In particular, one may put rather than "full transformation data", such as e.g. a gamma function stretching to apply locally, instead "compensation data" in such a color component, e.g. errors remaining compared to an original HDR image to be encoded differentially after a first approximative mapping from the first picture to a higher dynamic range image prediction, e.g. by using a single fixed gamma encoded as metadata per image time instant. This has as an advantage that only if the original approximation is considered not accurate enough (because of banding e.g.) that one may locally add some compensation data in the color component(s), which means only few additional bits need be spent.

Embodiments allow to work with a philosophy that HDR can be largely encoded as a reasonably looking 8 or 10 bit LDR grade (e.g by applying a best gamma function or other tone mapping like a sigmoidal function), and then e.g. critical HDR effects which do not predict well from the LDR/first picture encoding, may be encoded in the second picture color component(s). We have called this a second high dynamic range predicted image, and a second dynamic range transformation, to formally discriminate it from the first one where the dynamic range transformation is at least partially (and oftentimes fully) determined by the encoding in the color components of the second picture encoding, whereas in these embodiments it is determined by e.g. an prefixed transform like a typical LDR-HDR gamma mapping, and then that second predicted HDR image is finetuned with the compensation data, which may be additive "error correction" or another transformation, e.g. a tone mapping deviating from a gamma in certain luminance regions. But in general the HDR data need not be the same as a HDR picture or need not even have a picture geometry, since it can e.g. be a set of components for various multilinear luminance transformations to be applied on several regions of the first image. Note that a dynamic range transformation needs predominantly transformation along the luminance/luma axis (in particular whatever the code—even if encoded in 8 bit words—one needs to specify how bright colors will be generated on a rendering display), i.e. all will be encoded with reference to such a lightness-correlate dimension of a color space, and although also color modification may be involved (like correcting color space non-linearities, accounting for the shape of the displayable gamut, making use of trade-offs on the impact of light versus saturation, etc.), this should not be confused with wide color technologies, like e.g. multiprimary or more saturated primaries.

The skilled person will understand how to encode various HDR variants in such a two-pictures manner, namely, e.g. from the grader both a HDR and LDR grading may be available, and then e.g. the HDR version is encoded in as faithful as possible a differential prediction on the basis of a LDR signal which has its own specific quality criteria (specified by the grading on a standard LDR grading monitor). Or alternatively, there may be only a HDR image, but it is encoded in a prediction-from-LDR manner according to the invention. Or an HDR version may be predicted from a solely available (e.g. legacy) LDR video by means of an intelligent image processing apparatus, for any embodiment of these HDR signal encoding method to be used further down the line in a image or video transmission system then. Any of the LDR or HDR images and corresponding picture encodings may be directly obtained from a camera, or alternatively from image processing software, which e.g. includes HDR graphics effects like a fireball, or a landscape seen outside of a window. Furthermore any of the images may have undergone one or more image transformations, e.g. an original RAW LDR image may be compressed and subsequently decompressed according to an MPEG or JPEG model, to predict the HDR not on the basis of an original, but on the basis of what is reconstructable on the receiving side.

Of course the skilled person will understand which kind of intermediate operations may be involved like formatting, (un) packing, image transformation, etc. when e.g. going through a computation unit from an input format to an output format.

The invention may provide an improved approach for supporting increased dynamic range images in many systems. The approach may allow an efficient representation of both an image in a first lower dynamic range representation and a corresponding higher dynamic range image.

Although there are several physical entities which mathematically can be encoded as an image, such as a motion vector field or a depth map, there are a number of new and surprising considerations behind these present embodiments. We have a signal that was already preconditioned to have the place-holder pictures together in a particular way (i.e. sufficient space on the medium, a metadata format describing structure which would teach away in principle the skilled person to re-use it in a non-standard way unless a number of stringent conditions are fulfilled such as a recognized good need in the technical field, and an easy modification in particular if it is reasonably backwards compatible, etc.), namely that system is preconditioned for a number of related view images (typically geometrical views for stereo e.g.). The principle works because some of the data may not be necessary, i.e. even if a second luma image (i.e. second picture encoding luma component) is available, we may re-use the color components for something entirely different, related or not even related to one of the images, in particular potentially not related, or only tangentially related but not geometrically collocated with the image objects, to the image view in the second picture. This new meaning will then be signalled with new metadata, such as e.g. allowing some lesser capability systems to ignore some of the data, and higher capability systems to use it in a particular way. In particular, the encoded dynamic range extension data may have little to do with actual pixel values just encoding part of a real texture of an image, but they may have mathematical meanings depending on the actual LDR-to-HDR mathematics used. More interestingly, one consideration was that in the future one may not just want to have an HDR-via-LDR encoding (in particular allowing systems with legacy displays or lesser quality displays to use the LDR first image rather than to have to do image processing to derive their optimal LDR image from a solely HDR encoded image), but that for the consumer high quality video like high quality bluray disks may need to offer both 3D and HDR capability. More surprisingly the embodiments allow for this also, since the picture place holders can be used in such a way that the system partially behaves as it was intended (the Y components of the second picture(s) carry the 3D right view(s)), yet the color components carry something entirely different, nothing to do with any single coding technology like in the example 3D.

The invention may allow improved backwards compatibility. In particular, providing dynamic range extension data in a second picture allows many multiple picture encoding approaches to be reused. For example, (geometrical) multiview encoding approaches and standards may often be reused to a large extent. Further, amendments and changes to existing approaches and standards can be reduced while still allowing high quality dynamic range extension images. Furthermore, there is an interesting property that for geometric multiview encoding only the different luminance pictures are needed, and those can be (re)colored based on the specification of only one color picture (e.g. by displacement mapping), i.e. one can both store a stereo encoding, and use the available second picture color component—providing a high data capacity—for simultaneously encoding good quality HDR information. [n.b. we discriminate the geometrical views from generic views of the same scene, in that the former typically comprise varying angle or camera position on a line parallel to the scene, or scale, or defocus, etc., whereas the latter includes such properties as transformations of grey values or colors to represent the scene (e.g. make a scene look more misty)]

The approach may further provide a substantially reduced data rate e.g. in comparison to direct encoding of the high dynamic range image or direct encoding of the difference between the first encoded image and the high dynamic range image.

The dynamic range extension transform may be any operation, function and/or algorithm that can be applied to the first image to generate an image with an increased dynamic range. For example, a simple gamma transform may be applied, which already gives a good first approximation, at least a HDR look (e.g. the gamma may be so chosen that it largely retains the luminances of lower luminance object colors, and boosts highlights). The compensation data may provide an indication of a compensation that is to be applied to the result (or vice versa the input) of the dynamic range extension transform, and may specifically be an additive compensation value that is added to the image samples resulting from the transform (or to the image samples being input to the transform). This allows inter alia a high degree of tunability in the HDR look, interesting for applications such as e.g. low bandwidth delivery e.g. over internet, cable special channels, or mobile. But also, one could use the principle to directly co-encode as compensation data transformations of a content production site (e.g. store an original LDR encoding of a legacy movie, together with transformations which boost a couple of regions giving a more highlighted look, defined by a colour grader, or even a further modification of a first improvement transformation, e.g. which first transformation may serve as an optimal rendering for a very high quality display, and a second transformation deviating thereupon, may serve as a guiding transformation for intermediate dynamic range displays).

The first image may specifically be a Low Dynamic Range (LDR) image and the second image may be a High Dynamic Range (HDR) image.

The approach may for example allow an efficient communication of associated LDR and HDR information while allowing the individual images to be optimised as desired. E.g one or both of the LDR and HDR images can be manually colour graded to provide a desired (artistic) image. The LDR and HDR images can be individually colour graded to provide the desired effect while allowing this individual colour grading to be effectively represented in the image coding signal.

The compensation may be or may include a pre-compensation for the dynamic range extension transform. The precompensation may correspond to a compensation of the encoded first image prior to the application of the dynamic range extension transform.

The increased dynamic range image may typically have a larger gamut in the luminance direction than the encoded first image.

The first and second pixelised pictures may be compatible with a multi-view image representation.

In accordance with an optional feature of the invention, the method further comprises the step of including dynamic range extension data in the luminance component of the second pixelised picture, the dynamic range extension data e.g. comprising data representing the dynamic range extension transform, or usable as parametrization of the dynamic range extension transform, etc. I.e., if no 3D representation is necessary, one can use the two components (luminance and at least one of the chrominance pictures) for doing the LDR-HDR transformation, e.g. the luminance picture may contain a local approximate mapping like e.g. a boosting, and the chrominance may provide a further correction picture for fine-tuning that mapping. Storing a mapping separately, is advantageous since it may include very interesting information on how the two (LDR vs. HDR) representations of the captured scene relate to each other—in particular if there are underlying optimal color gradings, which specify the desired look of the artist for specific representation capabilities-which transform information can be used (without or together with the correction data) for mapping to different intermediate representations (e.g. for a reduced maximum luminance HDR display). It allows a very versatile decomposition by e.g. essentially defining a new functional transformation from the data in the luminance component of the second picture, which transformation may not even be an accurate specification of how one would derive a high quality HDR image from the LDR image (but rather it may e.g. roughly denote local transformations indicating potential application of some HDR effect, which may then be selected or determined finally by a display itself), and then making an accurate HDR image by the correction data in one or more color components.

This may improve the variation and flexibility of the transform and/or may provide an improved increased dynamic range image. The data representing the dynamic range extension transform may for example define a parameter of the transform, such as a weight for the transform (or one can apply two transforms with local weights), a gamma value for a power transform etc.

The approach may for example allow further freedom in the individual optimisation of the encoded first image (e.g. the LDR image) and the increased dynamic range image (e.g. the original HDR image or any approximation or derivation thereof), e.g. by a manual colour grader.

In accordance with an optional feature of the invention, the dynamic range extension compensation data comprises pixel error correction values for the first image, i.e. e.g. for the pixel positions in the first image.

Such error fields allow a better distribution over a desired functional transformation part and a correction part, which may be useful e.g. in view of an envisaged spectrum of final rendering environments (especially if these have various variants of their own image color transformation capabilities), or as an intermediate when further grading or modification of the image signal(s) may be expected, etc. Error correction values are a specific variant of compensation values (which may generically anything able to modify an envisaged luminance transformation), typically if a specific pixel luminance target value is envisaged for the (at least one) HDR image. Of course, compensation values can be manifold, allowing for transformations into several regions of the luminance range of scene objects.

In accordance with an optional feature of the invention, the pixel correction error values are indicative of a weighted difference between image pixel values of the increased dynamic range image and image pixel values of a corresponding input high dynamic range image.

This may in many scenarios allow a highly advantageous trade-off between complexity, accuracy and flexibility. In certain scenarios, the encoded first image may be generated from the input high dynamic range image (i.e. e.g. a digital master image composed of data from a high quality camera and computer effects). The increased dynamic range image may be a prediction for the input high dynamic range image, or the input lower dynamic range image, or both, etc.

For example, an HDR image may be received and converted to an LDR image (manually, semi-automatically or automatically). The dynamic range extension transform may be applied to the LDR image to generate a predicted HDR image for the input HDR image. The difference between the input HDR image and the predicted HDR image may then be determined. In some scenarios, these error values may be weighted (e.g. scaled) equally but in other embodiments different weights (e.g. scaling factors) may be applied to different error values. Note that various error measures may be applied to measure various error effects, e.g. a bright light may differ in value from an original capturing, but still be rated as well represented if it has an average pixel luminance value above a multiplicative factor times an average surround luminance.

In accordance with an optional feature of the invention, the method further comprises generating the dynamic range extension compensation data in response to a comparison of the increased dynamic range image and a corresponding input high dynamic range image.

This may in many scenarios allow a highly advantageous trade-off between complexity, accuracy and flexibility. The encoded first image may be generated from the input high dynamic range image. The increased dynamic range image may be a prediction or approximation for the input high dynamic range image.

For example, an HDR image may be received and converted to an LDR image (manually, semi-automatically or automatically). The dynamic range extension transform may be applied to the LDR image to generate a predicted HDR image for the input HDR image. The difference between the input HDR image and the predicted HDR image may then be determined.

In accordance with an optional feature of the invention, the dynamic range extension compensation data comprises colour saturation compensation data.

It is known that because classical LDR displays (and in particular the view with which they are driven or in other words in which the colors are represented on a range between black and white corresponding with minimal and maximal drive of the color channels) have a pointed gamut, that there is a trade-off relationship between higher luminance versus higher saturation. Higher dynamic range displays have an increased freedom of choosing these, e.g. making bright saturated blue, hence it may be advantageous to further specify correction functions also in the chromatic directions for at least one or several envisaged displays, or display strategies.

The first color component (e.g. Cr) may comprise luminance compensation data and the second color component (Cb) color compensation data.

Smartly allocating the data in the (at least) two color components may provide particularly advantageous performance in many embodiments and scenarios. In particular, it may allow a system with a very high degree of control over the generation of the final increased dynamic range image. E.g., the luminance picture of the second view may be used for 3D stereo, the first color component picture for local fine-tunings of the local LDR_to_HDR transformations, and the second color component may comprise additive compensation values for at least some pixels (possibly subsampled). Or if the luminance component of the second picture instead of storing a second geometrical view already contains good quality data for obtaining a reasonable HDR transformation/look, the two color pictures may e.g. contain several finetunings or deviation strategies for e.g. creating several derived HDR looks from the look obtainable with the transformation determined by the luminance component. One may even mix representations in the two components according to mixing schemes, e.g. particular subsamplings of coefficients in the avaible code words in the pixel positions, or geometrical suballocation in spatial subparts of the images corresponding to the component encodings, etc.

In accordance with an optional feature of the invention, the first encoded image is a first view image of a scene, and the method further comprises: including image encoding data for an encoded second image in the second pixelised picture, the encoded second image being a second view image for the scene.

This may be particularly advantageous in many embodiments and may specifically allow functionality such as transmitters, receivers, and communication media designed for geometrical multi-view signals, such as 3D signals, to readily be used for distribution of combined LDR/HDR images.

In accordance with an optional feature of the invention, only one of the encoded second (e.g. 3D multi-view set member) image and the dynamic range extension compensation data is comprised in the second pixelised picture (e.g. at least in the luminance component); and the method further comprises including in the image coding signal an indication (e.g. a predefined code word) of whether the second pixelised picture comprises the encoded second image or the dynamic range extension compensation data. Whereas typically the choice will be labeled for an entire movie or video program, by allowing the indication to vary in time, one may do it e.g. per (set of) scenes, in which case one could make e.g. programs which only have 3D for certain parts (or higher quality 3D for certain parts—one may envisage a news program in which the reportings are high quality 3D, but the talk of the news readers in between is 2D-to-3D converted in the television), and hence have more data space available for HDR or other properties in the 2D parts.

This may allow for facilitated interoperability of functionality for multi-view images and for higher dynamic range images. It may allow e.g. distribution media to readily be used for one or the other (or possibly both), while allowing easy determination of the appropriate treatment at the sink/receiving end.

In accordance with an optional feature of the invention, the image encoding data for the encoded second image is included in a luminance component of the second pixelised picture, and the dynamic range extension compensation data is included in the colour component of the second pixelised picture.

This may allow an efficient representation of both multi-view images and high dynamic range images in the same image signal. The data of the encoded second image may in some scenarios be only luminance data.

In some scenarios, the image encoding data for the encoded second image is included in a colour component of the second pixelised picture and the dynamic range extension compensation data is included in another colour component, or possibly in the luminance component, of the second pixelised picture.

In accordance with an optional feature of the invention, the method further comprises including further dynamic range extension compensation data in a further colour component of the second pixelised picture, the further dynamic range extension compensation data comprising data representing a second compensation for the increased dynamic range image.

This may allow further flexibility in the optimization/adaptation of the increased dynamic range image. The approach may for example allow alternative compensations or may e.g. allow the further colour component to provide more accurate compensation data which however is optional and therefore only used by more powerful receivers (one may think of displays allowing higher accuracy, of having more powerful image processing calculation engines, which can do more operations per second, or have different image processing functionality like programmable graphics primitives etc.).

In accordance with an optional feature of the invention, the dynamic range extension compensation data comprises pre-compensation data for applying to the encoded first image prior to the dynamic range extension transform.

This may provide particularly advantageous performance/operation in many embodiments and scenarios.

According to an aspect of the invention there is provided an apparatus for generating an image coding signal comprising for each image a first pixelised picture and a second pixelised picture having a luminance component and a colour component; the apparatus comprising: a first picture processor for including image encoding data for an encoded first image in the first pixelised picture; and a second picture processor for including dynamic range extension data such as e.g. dynamic range compensation data or any dynamic range modification function data in the colour component of the second pixelised picture.

According to an aspect of the invention there is provided a method of generating an increased dynamic range image, the method comprising: receiving an image coding signal comprising for each image a first pixelised picture and a second pixelised picture having a luminance component and a colour component, the image coding signal comprising: image encoding data for an encoded first image in the first pixelised picture, and dynamic range extension data in the colour component of the second pixelised picture, the dynamic range extension data; generating a first image from the image encoding data for the encoded first image; applying the dynamic range extension transform to the first image to generate a transform increased dynamic range image.

E.g., typically the method may comprise the steps:
generating a first image from the image encoding data for the encoded first image;
determining a dynamic range extension transform and applying a dynamic range extension transform to the first image to generate an increased dynamic range image; and
generating an enhanced dynamic range image on the basis of the data representing a compensation for the generated increased dynamic range image.

I.e. the method is then of an iterative type. The determining the dynamic range extension transform may be as simple as selecting a fixed transform for all the HDR images (e.g. a mere scaling), or involve parametric composition per region of pixels. The second step modifying therefrom, may e.g.

construct a second transform. The compensation may be of a simple, additive or multiplicative type by applying such a correction image (e.g. subsampled and then upconverted) to either the inputted (LDR) image prior to applying whatever first dynamic range extension transform, or it may be a post-correction, but also modification or specification of the transform itself may be involved. E.g. one may envisage applying for some regions the inverse of the default transform ($T^{-1}$) and then applying the modified, locally more appropriate transform ($T_2$), determined on the basis of at least some of the compensation data. Of course some strategies may be embodied to do that in a single pass (i.e. e.g. as an overwriting of the default transform strategy for determining the appropriate transform from the compensation data, and substituting it).

[So we discriminate by the following wording two high dynamic range images (typically obtainable on the basis of the low dynamic range image), namely an increased dynamic range image, which may be seen as a "rough variant" HDR image, and the final HDR image of better quality or usability etc. according to the presently described inventive embodiments, called enhanced dynamic range image. In case the color components contain only a single DR transformation without further compensation of course the prediction will be the final encoded HDR image]

According to an aspect of the invention there is provided an apparatus for generating an increased dynamic range image, the apparatus comprising: a receiver for receiving an image coding signal comprising for each image a first pixelised picture and a second pixelised picture having a luminance component and a colour component, the image coding signal comprising: image encoding data for an encoded first image in the first pixelised picture, and dynamic range extension data in the colour component of the second pixelised picture; a decoder for generating a first image from the image encoding data for the first image; and a transformation unit 520 arranged to apply a total dynamic range extension transform, formed on the basis of the dynamic range extension data, to the first image to generate the enhanced dynamic range image.

In many embodiments or practical realizations, the transformation unit 520 will be constructed comprising a transformer 507 for applying a first (typically rough, e.g. default selected from a limited set of transforms) dynamic range extension transform to the first image to generate a transform increased dynamic range image, and comprising a compensator 509 for generating an enhanced dynamic range image by applying a further correction strategy on that increased dynamic range image, e.g. applying an additive error correction picture, to obtain the final desired enhanced dynamic range image HDR (this being one of the ways to realize the total dynamic range extension transform by implementing it as a set of decomposed elementary transformations). The skilled person will realize how this can be re-embodied to apply e.g. a precompensation to the LDR image (by a precompensation unit) prior to applying a transform by transformer 507, or to load other transform strategies in the transformer, whether realized as a single or multiple units, hardware or software, etc.

According to an aspect of the invention there is provided a method of generating an image coding signal comprising for each image a first pixelised picture and a second pixelised picture having a luminance component; the method comprising: including image encoding data for an encoded first image in the first pixelised picture; and including dynamic range extension data in the luminance component of the second pixelised picture, the dynamic range extension data comprising data representing a dynamic range extension transform for generating an increased dynamic range image from the encoded first image.

The invention may provide an improved approach for supporting increased dynamic range images in many systems. The approach may allow an efficient representation of both an image and a corresponding higher dynamic range image.

The invention may allow improved backwards compatibility. In particular, providing dynamic range extension data in a second picture allows many multiple picture encoding approaches to be reused. For example, (geometric) multi-view encoding approaches and standards may often be reused to a large extent. Further, amendments and changes to existing approaches and standards can be reduced while still allowing high quality dynamic range extension images.

The approach may further provide a substantially reduced data rate e.g. in comparison to direct encoding of the high dynamic range image or direct encoding of the difference between the first image and the high dynamic range image.

The dynamic range extension transform may be any operation, function and/or algorithm that can be applied to the first image to generate an image with increased dynamic range. For example, a simple gamma transform may be applied.

The transform provides an efficient approach for increasing the dynamic range without requiring detailed information for the high dynamic range image to be communicated. Thus, the use of a dynamic range extension transforms allows an efficient extension of the dynamic range without requiring detailed data precisely describing the extension to be communicated (only as much HDR image object improvements as necessary or desirable need to be included).

The first image may specifically be a Low Dynamic Range (LDR) image and the second image may be a High Dynamic Range (HDR) image.

The approach may for example allow an efficient communication of associated LDR and HDR information while allowing the individual images to be optimised as desired. E.g one or both of the LDR and HDR images can be manually colour graded to provide a desired (artistic) image. The LDR and HDR images can be individually colour graded to provide the desired effect while allowing this individual colour grading to be effectively represented in the image coding signal.

The increased dynamic range image may have a larger gamut in the luminance direction than the encoded first image.

The first and second pixelised pictures may be compatible with a multi-view image representation.

In accordance with an optional feature of the invention, the dynamic range extension data comprises a scaling factor for at least one colour component of the encoded first image.

This may provide a low complexity yet efficient transform for increasing the dynamic range.

In some embodiments, the dynamic range extension data may comprise a scaling factor for at least one luminance component of the encoded first image.

In accordance with an optional feature of the invention, the scaling factor includes values that result in a reduced dynamic range for at least one pixel of the image.

The invention may allow a flexible optimization/adaptation of the increased dynamic range image. In particular, the approach may allow the luminance or brightness of some areas to be extended whereas other areas may possibly be dimmed or diminished.

In accordance with an optional feature of the invention, the first encoded image is a first view image of a scene, and the method further comprises: including image encoding data for an encoded second image in the second pixelised picture, the encoded second image being a second view image for the scene.

This may be particularly advantageous in many embodiments and may specifically allow functionality such as transmitters, receivers, and communication media designed for multi-view signals, such as 3D signals, to readily be used for distribution of combined LDR/HDR images.

In accordance with an optional feature of the invention, the method further comprises: including further dynamic range extension data in a component of the second pixelised picture, the further dynamic range extension data comprising data representing a further dynamic range extension transform for generating an increased dynamic range image from the encoded first image.

This may allow further flexibility in the optimization/adaptation of the increased dynamic range image. The approach may for example allow alternative compensations or may e.g. allow the further colour component to provide more accurate compensation data which however is optional and therefore only used by more powerful devices.

According to an aspect of the invention there is provided an apparatus for generating an image coding signal comprising for each image a first pixelised picture and a second pixelised picture having a luminance component; the apparatus comprising: a first picture processor for including image encoding data for an encoded first image in the first pixelised picture; and a second picture processor for including dynamic range extension data in the luminance component of the second pixelised picture, the dynamic range extension data comprising data representing a dynamic range extension transform for generating an increased dynamic range image from the encoded first image.

According to an aspect of the invention there is provided a method of generating an increased dynamic range image, the method comprising: receiving an image coding signal comprising for each image a first pixelised picture and a second pixelised picture having a luminance component, the image coding signal comprising: image encoding data for an encoded first image in the first pixelised picture, and dynamic range extension data in the luminance component of the second pixelised picture, the dynamic range extension data comprising data representing a dynamic range extension transform for generating an increased dynamic range image from the encoded first image; generating a first image from the image encoding data for an encoded first image; applying the dynamic range extension transform to the first image to generate a transform increased dynamic range image; and adapting the dynamic range extension transform in response to the dynamic range extension data.

According to an aspect of the invention there is provided an apparatus for generating an increased dynamic range image, the apparatus comprising: a receiver for receiving an image coding signal comprising for each image a first pixelised picture and a second pixelised picture having a luminance component, the image coding signal comprising: image encoding data for an encoded first image in the first pixelised picture, and dynamic range extension data in the luminance component of the second pixelised picture, the dynamic range extension data comprising data representing a dynamic range extension transform for generating an increased dynamic range image from the encoded first image; a decoder for generating a first image from the image encoding data for an encoded first image; a transformer for applying the dynamic range extension transform to the first image to generate a transform increased dynamic range image; and an adjuster for adapting the dynamic range extension transform in response to the dynamic range extension data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which

FIG. 6 illustrates an example of elements of dynamic range extension data in accordance with some embodiments of the invention;

DETAILED DESCRIPTION OF SOME EMBODIMENTS OF THE INVENTION

Figure 1:
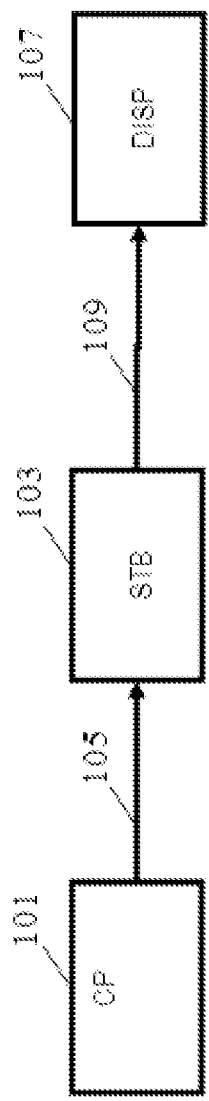
FIG. 1 is an illustration of a distribution path for audiovisual content.

FIG. 1 illustrates an example of an audio visual distribution path. In the example, a content provider apparatus 101 generates an audio visual content signal for an audiovisual content item, such as e.g. a film, a television programme etc. The content provider apparatus 101 may specifically encode the audiovisual content in accordance with a suitable encoding format and colour representation. In particular, the content provider apparatus 101 may encode the images of a video sequence of the audiovisual content item in accordance with a suitable representation such as e.g. YCrCb. The content provider apparatus 101 may be present at a site of a production or distribution house that creates or broadcasts the content.

The audio visual content signal may be distributed to a content processing device 103 via a distribution path 105. The content processing device 103 may for example be a set-top box residing with a specific consumer of the content item (the settopbox may have significant storage and computational resources, e.g. being able to apply various simple and/or advanced image processing transformations).

The audio-visual content is encoded and distributed from the content provider apparatus 101 through a medium, which may e.g. consist of packaged media (DVD or BD etc.), Internet, or broadcasting. It then reaches a source device in the form of the content processing device 103 which comprises functionality for decoding and playing back the content.

It will be appreciated that the distribution path 105 may be any distribution path and via any medium or using any suitable communication standard. Further, the distribution path need not be real time but may include permanent or temporary storage. For example, the distribution path may include the Internet, satellite or terrestrial broadcasting etc, storage on physically distributed media such as DVDs or Blu-ray Disc or a memory card etc. Likewise, the content processing device 103 may be any suitable device such as a Blu-ray Player, a satellite or terrestrial television receiver, etc.

The content processing device 103 is coupled to a display 107 via a communication path 109. The content processing device 103 generates a display signal comprising an audiovisual signal representing the audiovisual content item. The display signal may specifically be the same as the audiovisual content signal. Thus, the source device streams the decoded content to a sink device, which may be a TV or another device which converts the digital signals to a physical representation. As with all illustrations, they merely schematically serve to elucidate and teach the inventive concepts in a simple, comprehensible manner, and the skilled person will realize that with nowadays advanced systems, the content processing functionality may be integrated with the display device, e.g. all being in a portable HDR device, such as a tablet, or devices which can be temporarily attached, e.g. to a wall. Similarly, the functionalities may be dispersed over home networks, e.g. with a high quality display rendering a high resolution large scale HDR scene being rendered in the bedroom in the evening, whereupon a further signal may be locally superimposed (e.g. a visual communication path with a friend, which may have a different HDR luminance quality, e.g. dynamic range, or grading grey value range allocation, etc.), but some of these signals may also be re-communicated to e.g. a small portable display.

In some embodiments the data representing the images of the audio visual content are the same for the audiovisual content signal and for the display signal. In this example, the display 107 may comprise functionality for image processing including e.g. generation of images with increased dynamic range. However, it will be appreciated that in some embodiments, the content processing device 103 may perform e.g. image enhancement or signal processing algorithms on the data and may specifically decode and re-encode the (processed) audiovisual signal. The re-encoding may specifically be to a different encoding or representation format than for the audiovisual content signal. E.g. the display may need different HDR features encodings, because of its inherent capabilities (the settopbox may be made aware of that by means of a handshaking, and thereby transform a generic input HDR signal into a specific HDR signal for the display, or for temporal storage (knowing the display only has certain capabilities), etc.).

The system of FIG. 1 is arranged to provide High Dynamic Range (HDR) video information. Further, in order to provide e.g. improved backwards compatibility, it also provides Low Dynamic Range (LDR) information that allows an LDR image to be presented. Specifically, the system is able to communicate/distribute information relating to both an LDR and HDR image in a single signal (whether the audiovisual content signal or the display signal), signal being a related set of data (e.g. juxtaposed, interleaved, and/or co-encoded, etc. . . . ), together being usable for processing, transmission, etc. The approach is based on the image coding signals (the audiovisual content signal or the display signal) using a format wherein each image or frame of the video signal is encoded using a plurality of pictures. Such an encoding is for example used for communication of stereo or multi-view images where a picture is encoded for each of the views. Specifically, for a stereo image, the image coding signal comprises both a right and a left picture for each frame or image of the video sequence.

The system of FIG. 1 uses a first of the pictures for each image to provide an LDR image. Typically, this LDR image may be generated by the content provider or a content originator by an automated, or more typically a semi-automated or manual process. For example, the content provider for a film may perform a manual colour grading or tone mapping to an original HDR video sequence to generate a corresponding LDR video sequence. This approach allows improved LDR images to be distributed that are optimised to provide a preferred visual impression. Although such a process is complex and time consuming, it typically needs to be performed only once per content item. For example, a producer may convert an original film (e.g. digital master) from a higher dynamic range to a lower dynamic range when the movie is converted from a cinema format to be issued on Blu-ray Disc, or DVD.

The LDR image may be encoded in the first picture in accordance with any encoding format and colour representation, and may specifically be encoded using a pixel colour representation having one luminance component and at least one chroma component (where the skilled person will understand the variants, we will for simplicity describe some embodiments with classical television (e.g. MPEG2) chroma signals and the related). In the example, for each picture element in the first picture of the image coding signal, the first picture provides a luminance sample value and one or more chroma sample values. Specifically, the system may have one luminance and two chroma components and may in many embodiments advantageously be a YCrCb colour representation.

The image coding signal further comprises at least a second picture for each image/frame (typically the image corresponding to a single moment in time of a video sequence). However, the second picture does not merely contain an alternative image such as a different geometrical view image, but rather contains HDR data that allows a receiver to generate an HDR image corresponding to the LDR image. Thus, the second picture contains dynamic range extension data which is indicative of how an HDR image can be generated from the LDR image of the first picture.

Furthermore, this dynamic range extension data is provided in a picture format and is thus compatible/consistent with a picture representation and structure (i.e. the data is the same, and could e.g. be used to make a stereo pair, only that would look strange, but by reinterpreting it in one of the various corresponding—typcially co-encoded, e.g. by a strategy identification or explanation—possible HDR encoding strategies, it allows making at least one HDR image). Specifically, the same picture structure may be used as for the first picture. Hence, the dynamic range extension data may be encoded on a pixel basis to fit into a pixelised picture data structure (only, the meaning of these pixel values will be different, and that meaning can be co-encoded, even with such little data as a type code for a predetermined type). The second picture comprises at least one luminance component or one chroma component. In the following, the description will focus on an example wherein the second picture comprises one luminance component and two chroma components, and specifically on an example wherein the second picture employs a YCrCb structure.

Thus, the second picture is a pixelised picture which includes dynamic range extension data for generating an increased dynamic range extension image from the encoded first image (i.e. the LDR image in the first picture). It will be appreciated that the extension data may relate to each pixel of the second picture. The second picture need not include a data value for each pixel. For example, some pixels may use nominal or default values that need not be communicated or some values may be used for a plurality of pixels (note that HDR modification need not necessarily have the same high definition as a basis structure encoding the picture content/texture). However, typically the second image will provide information on a dynamic range extension for each pixel of the first image (i.e., such a transformation can be derived, e.g. if no explicit data is included for a given pixel this indicates that the pixel should use a default value or a value provided for another pixel, or even just apply a standard transform like an identity transform to the LDR pixel value, etc.; note that even parameters for semi-global transforms can be encoded as pixel values). Thus, whereas the second picture may not necessarily include a data value for each pixel, it may still provide information for each pixel and the structure of the second picture may specifically allow a (possibly different) value to be defined for each pixel. Note that interpolation strategies may be very simple, especially for low subsampling ratios (e.g. if a local texture pattern has to be relighted, that can be done by using relighting information for some of the LDR pixels, and further relying on the LDR texture encoded in the LDR picture). Also for gradually changing lightness modifications, even making minor spatial errors is not a major concern, as is evidenced by the lower resolution of e.g. LED backlights, or many grading transformations.

We will make the distinction in this text between the term image, which is the geometric composition of pixelised objects as e.g. captured by a camera (or generated in a computer graphics environment), and the term picture, which is one of the many possible encodings, and in particular gradings of that image (i.e. the image is kind of the father of a family of pictures, and it may e.g. be a camera raw file, whereas a first picture derived therefrom may be an 8-bit linear encoding, and a second picture an 8-bit non-linear encoding with a gamma 0.45). Grading is typically an artistic changing of the pixel colors (by a human color grader), whereas encoding tends to be purely technical/mathematical.

A picture is a place-holder which can encode a normally viewable/renderable scene objects texture capturing, but as seen in the present embodiments it need not actually comprise such a data. As e.g. seen in FIG. 14, the spatially adjacent words may comprise such parameters as e.g. gamma coefficients and offsets for locally transforming the LDR first image pixels into HDR image pixels (according to the mathematics e.g. in 14 bits words). There may be some image structure still visible in this scenario, since although e.g. the gamma coefficients may looks like e.g. dark grey values, they will typically still follow the object boundaries in view of the different locally required transformations. In case the model numbers also change along the color component from e.g. "gamma brightening" to "linear boost" to "sigmoidal fitting" etc., how the color component will actually look as an image when displayed may be very different from any view image of the original scene (hence the term "dynamic range extension data"). Also e.g. an error picture does not directly provide a visual representation of a scene but provides only a representation of a visual difference between two pictures (i.e. it at best shows sketchy edges of the underlying objects, if too simplistic a prediction went wrong there). Thus the error picture relates to the reference image. A picture may not in itself represent the actual scene but may provide visual information in a structure corresponding to an array/arrangement with a number of pixels, such as e.g. a rectangular array with W×H pixels. So the systems are typically signalled how to deal with these strange new encodings when doing their HDR processing.

The approach may be applied on either one or both of the distribution link 105 from the content provider apparatus 101 to the content processing device 103 and link 109 from the content processing device 103 to the display 107. Furthermore, the approach may be applied differently on the two paths, e.g. by using different colour representations or encoding standards.

The approach provides for a system wherein higher dynamic range information can be communicated together with a lower dynamic range image. Thus, an image is provided which directly can be used by suitable equipment while at the same time providing additional information for suitable equipment to provide an improved image with an increased dynamic range. Furthermore, this can be achieved while maintaining a low data rate and using approaches and structures that require little modifications of current standards and approaches.

The approach is particularly suited for a combined distribution of corresponding Low Dynamic Range (LDR) images and High Dynamic Range (HDR) images. The LDR image is encoded in the first picture, whereas the second picture is encoded to include extension data which describes (at least partially) how the LDR image can be extended to provide an HDR image. The system can thus provide an optimised LDR image which for example has been tone mapped from an original movie source with higher dynamic range (typically with a smartly chosen S-shaped curve or similar, but thereupon more specific local luminance tunings may be applied). This LDR image can for example be generated by specific tone mapping. Further, the dynamic range extension data allows for an HDR image to be generated which can be targeted to provide an optimised performance for the HDR image (ideally, the HDR image generated from the LDR image, has a look similar to the original HDR captured movie, but for such a look, the HDR may also be specifically graded with a specific rendering technology and viewing environment in mind).

The direct relationship between the LDR and HDR images can thus be dynamically and locally changed such that a much improved HDR image can be generated. Indeed, to some degree the approach allows an individualised optimisation of the LDR and HDR images. For example, for a very bright area a first relationship may be used to generate the HDR image from the LDR image whereas in a dark area a different relationship may be used. Thus, the HDR image may provide an improved visual impression than if the same fixed relationship was used. Furthermore, the content provider may dynamically, flexibly, and possibly manually determine and define the required translation to generate the desired HDR image. These advantages can be achieved without necessarily requiring a detailed encoding of the HDR image (whether directly or differentially with respect to the LDR image). Rather, a parameter of a transform that can be applied to the LDR image may be defined thereby allowing the transform to be adapted locally. Alternatively or additionally, compensation for the transform may be provided. This compensation data may define how the output of the transform should be modified to generate the desired image. Thus, dynamic range extension data can be provided which provides information of how a dynamic range extension transform and/or the input or output of the transform should be modified to provide the desired image. The transform may specifically be applied independently to each pixel of the LDR image, and the second picture may allow dynamic range extension data to be applied individually for each pixel.

Conventional displays typically use an LDR representation. Typically such LDR representations are provided by a three component 8 bit representation related to specified primaries. For example, an RGB colour representation may be provided by three 8 bit samples referenced to a Red, Green, and Blue primary respectfully. Another representation uses one luma component and two chroma components (such as YCrCb). These LDR representations correspond to a given brightness or luma range (typically one presupposes these are intended for a 500 nit white display, with e.g. 20 nit average surround etc., and one the capturing side they correspond to a range of captured, and clipped luminances selected by the director of photography).

However, increasingly image capturing devices are provided which can capture larger dynamic ranges. For example, cameras typically provide 12 bit, 14 bit or even 16 bit ranges. Thus, compared to a conventional standard LDR 8 bit camera, an HDR camera may faithfully capture, 12 bit, 14 bit (or higher) (linear) from a brighter white to a given black. Thus, the HDR may correspond to an increasing number of bits for the data samples corresponding to LDR thereby allowing a higher dynamic range to be represented.

HDR specifically allows for significantly brighter images (or image areas) to be presented. Indeed, an HDR image may provide a substantially brighter white than can be provided by the corresponding LDR image. Indeed, an HDR image may allow at least four times brighter white than the LDR image. The brightness may specifically be measured relative to the darkest black that can be represented or may be measured relative to a given grey or black level.

The LDR image may specifically correspond to specific display parameters such as a fixed bit resolution related to a specific set of primaries and/or a specific white point. For example, 8-bits may be provided for a given set of RGB primaries and e.g. a white point of 500 Cd/m$^2$ (i.e. specifying a set of colors within a gamut). The HDR image is an image which includes data that should be rendered above these restrictions. In particular, a brightness may be more than four times brighter than the LDR white point (e.g. 2000 Cd/m$^2$) or more.

High dynamic range pixel values have a luminance contrast range (brightest luminance in the set of pixels divided by darkest luminance) which is (much) larger than a range that can be faithfully displayed on the displays standardized in the NTSC and MPEG-2 era (with its typical RGB primaries, and a D65 white with for maximum driving level [255, 255, 255] a reference brightness of e.g. 500 nit or below). Typically for such reference display 8 bits suffice to display all grey values between approximately 500 nit and approximately 0.5 nit (i.e. with contrast range 1000:1 or below) in visually small steps (especially if one considers other typical factors like source noise), whereas HDR images are encoded with a higher bit word, e.g. 10 bit (which is also captured by a camera with a larger well depth and DAC, e.g. 14 bit). In particular, HDR images typically contain many pixel values (of bright image objects) above a scene white, in particular, several pixels are brighter than 2 times a scene white. This scene white may typically be equated with the white of the NTSC or MPEG-2 reference display (and on the content production side, scene white, 18% grey, and scene black may be defined within a well-illluminated middle range of the entire range e.g.).

The number of bits used for the HDR images M may typically be larger than or equal to the number of bits N used for LDR images (N may typically be e.g. 8 or 10 bit (per color channel if several of the channels are used), and M may e.g. be 14 or 16). A transformation/mapping may be required to fit pixels in a smaller range, e.g. a compressive scaling. Typically, a non-linear transformation may be involved, e.g. a logarithmic encoding may encode (as lumas) a far larger luminance range in an N-bit word than a linear encoding, be it that the luminance difference steps from one value to the next are then not equidistant, but nor are they required to be so for the human visual system.

The following description will focus on a representation of LDR and HDR image information in pixelated picture representations compatible with a stereo image representation. Specifically, the LDR image will be encoded in the left picture and the HDR extension data is encoded in the right image, especially in one or more colour/chroma components of the right image. However, it will be appreciated that this is merely an exemplary description provided for clarity and brevity and is not intended to indicate any loss of generality of the described images. Indeed, it will be appreciated that the principles are not limited to LDR and HDR images but can be applied to any system seeking to provide increased dynamic range extension based on a first reference image. It will also be appreciated that the references to left and right pictures are merely for brevity and that no specific correlation between the encodings and a spatial characteristic is intended.

Figure 2:
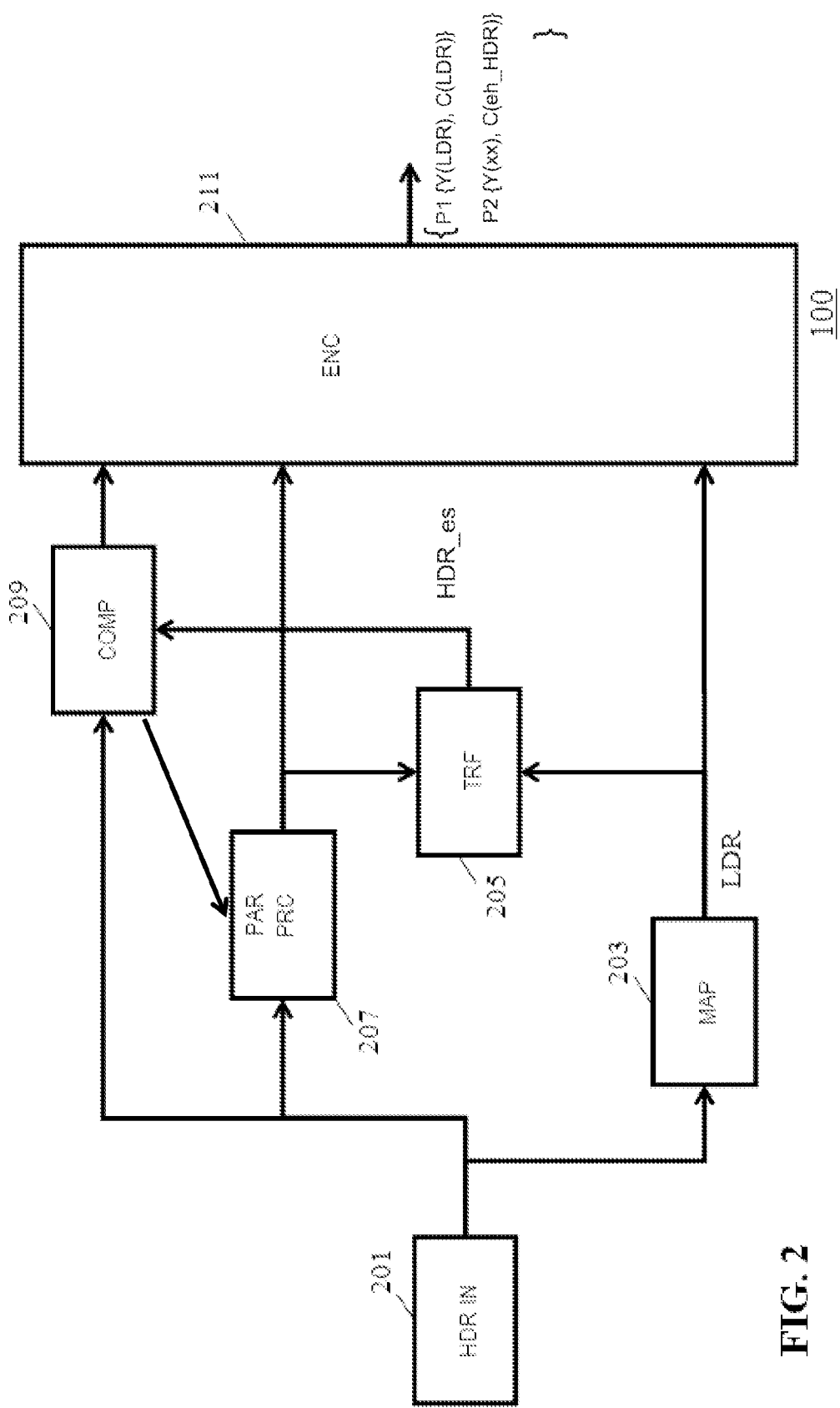
FIG. 2 illustrates an example of elements of an image encoder in accordance with some embodiments of the invention.

FIG. 2 illustrates an example of an encoder in accordance with some embodiments of the invention. The following description will focus on an example wherein the encoder is located at the content provider apparatus 101 but it will be appreciated that the described principles and indeed the encoder of FIG. 2 could also be provided in e.g. the content processing device 103. Although we more detailedly elaborate an interesting example of encoding compensation data for e.g. a global or a couple of local predefined (e.g. co-encoded in metadata) transformation strategies, the skilled person understands from the total teaching how also other transformation strategies can be encoded in the color components.

In the example, the encoder comprises an HDR input 201 which receives an HDR input image. The HDR input image may for example originate in an HDR camera using e.g. 12 or 14 bit per component (e.g. RGB or YCrCb, or a digital cinema encoding, etc.) or may e.g. be a video sequence from a major cinema release generated using a high dynamic range celluloid movie and a telecine. As another example, the input images may be computer generated as HDR images with a high dynamic range and high bit representation.

The HDR input 201 is coupled to a tone mapping unit 203 which proceeds to generate an LDR image from the received HDR image. It will be appreciated that any suitable generation of an LDR image corresponding to an HDR image may be used. In the example a semi-automated tone mapping or grading may be used, e.g. wherein an initial LDR image is generated automatically followed by a manual adjustment to provide the desired visual impression for LDR. For example, an operator may manually modify the tone mapping or colour grading in individual image areas. For example, the LDR image may be manually optimised in image areas corresponding to a human face etc. The LDR image may be generated so that it looks optimal on legacy displays, or according to other criteria like obtaining a particular scene description for other applications, and so that it still looks reasonable on legacy displays.

Thus, the encoder has an original HDR image and a corresponding LDR image available. The encoder then proceeds to generate dynamic range extension data which describes how an HDR image can be generated from the LDR image. In the example, the dynamic range extension data is specifically determined such that the resulting generated HDR image resembles the original HDR image as much as possible (which may be based on purely numerical criteria like PSNR, or human visual criteria, etc.). In other embodiments, a manual tone mapping or colour grading may be applied to the HDR image. For example, modifications may be provided to the input HDR image by a manual process and the dynamic range extension data can be determined such that the resulting generated HDR image resembles this modified HDR image as much as possible (this may e.g. allow for tuning on the display side, to obtain a close similarity of what the grader intended in a certain HDR look).

In the encoder of FIG. 2, the tone mapping unit 203 is coupled to transform unit 205 which receives the LDR image and proceeds to apply a dynamic range extension transform to generate an increased dynamic range image (HDR_es). The increased dynamic range image is specifically an HDR image and has a higher dynamic range than the LDR image. Specifically, it may have a white point which is at least four times brighter than the LDR image. The HDR image may represent the pixels by more data bits than the LDR image. E.g. the LDR image may use 8 bits per pixel component (e.g. RGB or YCrCb) whereas the HDR_es image may use 12, 14 or even more bits per pixel.

As a specific low complexity example, the transform may be an exponential or gamma transform which generates an HDR output pixel by applying a power to the luma value for the corresponding LDR pixel, e.g.

$$Y_{HDR}=Y_{LDR}{}^{\alpha}$$

where α is a transform parameter.

Figure 3:
FIG. 3 illustrates a possible transform between luminance values of an HDR image and luminance values of an LDR image.

As another example, a piecewise linear relationship may be provided between the LDR luminance and the HDR luminance, such as e.g. illustrated in FIG. 3. In such an embodiment, each of the transition points between the linear segments may be indicated by suitable parameters. It will be appreciated that the transform function may increase the dynamic range substantially for example by transferring an input luminance range of [0.05,1] referenced to a suitable colour representation to a much larger range according to the same representation.

As yet another example, the following transform may be applied to the pixel at position i,j in the image:

$$Y_{HDR}=k \cdot Y_{LDR}+k_2(Y_{LDR}-e)^b$$

where k, $k_2$, e and b are suitable transform parameters (and could be encoded as (parts of) images, i.e. encoding spatially varying parameters like b(i,j) in which i and j are spatial pixel positions; e.g. the level parameter e may be encoded on a coarser scale (e.g. 50×50 pixels) than the power modifier b).

Another example of a useful parametrizable transform is $Y_{HDR}=[k(i,j)*Y_{LDR}+\text{offset}(i,j)]\hat{\ }\text{pow}(i,j)$, meaning three component pictures are needed, however, one could fix e.g. the power pow(i,j) for large regions of blocks, and only encode that as intermittent metadata.

Of course, by subsampling, one can encode several such local functions in only one component picture.

Figure 14:
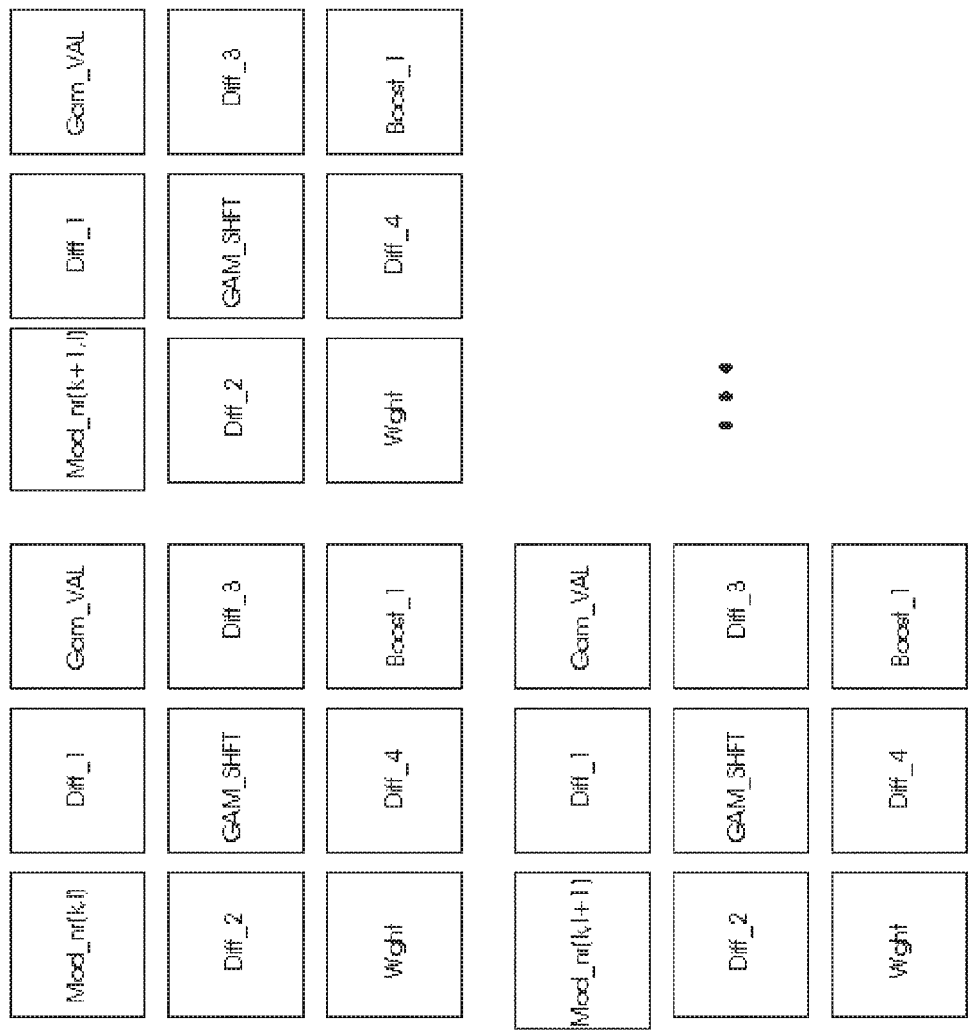
FIG. 14 illustrates a possible coding of a couple of HDR transformation model data parameters in a subsampled configuration.

FIG. 14 gives an example of a complex encoding of several model parameters in only one component (e.g. the full resolution Y, but it may also be a chroma component).

In this example a number of parameters are interleaved on a 3×3 repetitive scheme (denoted by subsampled local position indices k and l), each parameter having e.g. a 8 bit value. On diagonal positions are parameter values of the transformation model to be applied to the underlying LDR pixels, and on the other (diamond) positions (Diff_1, Diff_2, . . . ) is a field of differences to obtain the HDR picture by addition to the HDR prediction from the model (after interpolation). Mod_nr indicates a model number, e.g. that in this region a gamma model will be used. Further diagonal positions can be used for local parameters of the gamma function, e.g. the 3,1 pixel value may contain an exponent Gam_VAL. The 2,2 position may contain a shift GAM_SHFT of the value along such a gamma function (i.e. the LDR pixel value as an index determines a certain x-position on the gamma function, and this is offsetted to a new x-position, from which the HDR value can be read). Another model is encoded in parameter 3,3, namely, a linear boost (boost_1). Parameter 1,3 contains a weight factor Wght, e.g. a factor between 0 and one as encoded with a precision of 8 bit, with which the first prediction (the gamma modification) and the second prediction (the linear boost) should be averaged (this weighing could indicate e.g. spatial adjacency, or preferred look in a hierarchy of effects, from mild to strong, etc.). The next 3×3 pixel set (k+1, l) contains similar parameters for the next HDR determination. It should be clear to the skilled person how in such a manner several encodings can be co-specified, in such a way many interesting functions can be encoded, whether purely from a minimal information view, or from a versatility view, allowing creative content creators to co-encode many HDR look optimization transforms which can be applied to certain degree by several receiving systems. E.g., the user of a system may select to only use the first transform on his remote control (with full weight=1) because he prefers that effect/rendering, etc. Also scalable systems can discard some of that information before e.g. transmitting over a mobile link to a portable display.

Note that the codes may also correspond to particular boosts, e.g. 1=+20 luminance units, 2=+40, 3=+100, etc. Transform data can correct, complement, override etc. pre-specified transforms.

In the example of FIG. 2, the transform is not a fixed transform but is rather a transform which can be adjusted by modifying various parameters. E.g. in the previous example, the applied power b may be different for each pixel or set of pixels and may be dynamically modified. Similarly, the transition points between linear pieces of the transfer function of FIG. 3 may be different for each pixel and may be dynamically modified. In the example, a single parameter value may be applied for each pixel with all transition points being provided as a function thereof. For example, the transfer function may simply be scaled with the scaling factor being individual set for each pixel. As another example, the value of the transform parameter α for the transform:

$$Y_{HDR}=Y_{LDR}{}^{\alpha}$$

may be changed for each individual pixel of the LDR/HDR images.

The individual parameters may not all be individually settable for each pixel but for example one or more of the parameters may be subsampled.

In some embodiments, the transform parameter may be determined on the basis of the HDR image or e.g. the LDR image directly. For example, for dark areas of the image, the transform parameter(s) may be set to a first value, and for light areas another transform parameter may be set. The transform parameter may in this way be automatically set to suitable values based on the input HDR image (or the LDR image).

However, in other embodiments the transform parameter may be set semi-automatically or fully manually. For example, a first set of transform parameter values may be generated automatically based on the input HDR image. The resulting estimated HDR image may be presented to an operator who may manually modify the parameters to provide an estimated HDR image that is more desirable. This modification may be used to provide an estimated HDR image that more closely resembles the original HDR image but could potentially additionally or alternatively be used to provided desired visual impressions that are not present in the original image. Thus, an artistic modification could be manually applied.

Although such a manual intervention may be complex and time consuming it may be suitable for many practical applications as the operation need only be performed once for a given content item. For example, when converting a movie to be distributed on Blu-ray Disc™, the tone mapping for the LDR image generation need only be performed once. Similarly, the fine tuning of transform parameters to generate an HDR image from the LDR image or from an original HDR image need also only need to be performed once.

In some embodiments, the transform parameters may automatically be determined to result in the generated HDR image HDR_es being as close an approximation to the original image as is possible. In such an example, the parameter processor 207 may e.g. be coupled to the HDR input 201 and the (optional) transform unit 205 and may receive the original HDR image from the HDR input and the estimated HDR image from the transform unit 205. The parameter processor 207 may then proceed to determine the transform parameters by a suitable optimisation process. It will be appreciated that any suitable adaptation algorithm and distance measure between the original and the generated HDR images may be used. E.g. a least Mean Square adaptation approach may be applied.

As a specific example, an initial HDR image may be generated based on default transform parameters for each pixel (e.g. using a fixed dependency on image characteristics of the HDR image). The parameter processor 207 may then for a first pixel sequentially modify the transform parameter value until a minimum distance measure is achieved between the original and the generated HDR image. The system may then proceed to the next pixel to find a local minimum for that pixel. After all pixels have been adjusted, the system may proceed to perform a second pass. Thus, a recursive and pixel sequential optimisation may be performed. Although such an approach is quite computationally intensive, it may only be performed once per content item and thus may be acceptable.

The exemplary encoder further comprises a comparator 209 which is coupled to the HDR input 201 and the transform unit 205. The comparator 209 receives both the original input HDR image and the generated HDR image HDR_es (after optimisation of the transform parameters). The comparator 209 then proceeds to generate dynamic range extension compensation data which represents a compensation that can be applied to the HDR image generated by the transform unit 205 (i.e. it may e.g. consider that the data in the transforms is sufficient, or that an additional error picture is needed, etc.).

Thus, the dynamic range extension compensation data may provide post-processing data that can be applied to the output of the transform process to generate an HDR image. The compensation data can specifically provide data that can be applied to the generated HDR image to make this closer to the original HDR image.

The compensation data may specifically be error data indicative of the difference between the generated HDR image and the original HDR image. The comparator 209 may specifically subtract the pixel values of the two HDR images from each other to generate a difference image that is uses as compensation data, and then e.g. only retain this difference picture for critical areas, such as e.g. precise (silky) varying color profiles on objects.

Hence, in the specific example, the encoder generates an LDR image that can be used directly by LDR equipment. Furthermore, it determines transform parameters for adapting a dynamic range extension transform that can be applied to the LDR image to generate an HDR image. The generated HDR image can specifically be a prediction HDR image for the original HDR image based on the LDR image (or can be a prediction for another HDR image such as a manually adapted version of the original HDR image). The encoder further generates compensation data which provides information on a modification which can be applied to the generated HDR image. Specifically, error or difference data for the prediction HDR image relative to the input HDR image can be generated.

It will be appreciated that whereas the description for brevity refers to the LDR image generated by the tone mapping unit 203, the LDR image used as an input to the transform may be an image that also represents the encoding and decoding process which is performed in the decoder. Specifically, the generated LDR image may be encoded in accordance with a suitable encoding scheme to generate encoded LDR data. This may be included in the output stream sent to a decoder. The encoded LDR data may furthermore be decoded using a decoding algorithm corresponding to that used by a decoder. This will generate an LDR image which corresponds directly to that which will be generated at the decoder. This encoded/decoded LDR image is then used as an input to the transform to generate the predicted HDR image in the encoder. In this way, it is possible for the encoder to perform exactly the same operation as the decoder and to generate a predicted HDR image which is the same as that which will be generated in the decoder. Thus, a residual or error image relative to the HDR image will not only reflect inaccuracies in the prediction but also in the encoding and decoding process. Thus, improved image quality can be achieved.

Thus, for a lossless encoding of the LDR image generated by the tone mapping unit 203, the tone mapped LDR image can be used directly by the transform unit 205 as illustrated in FIG. 2. However, for a lossy encoding of the LDR image, such an approach may result in degradation due to the prediction in the decoder being based on an encoded/decoded LDR image rather than the original tone mapped LDR image. This degradation may be acceptable in some embodiments, but typically it will be advantageous to perform the transform in the encoder based on an encoded/decoded LDR image corresponding to that generated at the decoder. Accordingly, the encoder may include an encoding function for encoding the LDR image and a decoding function for decoding the resulting data to provide a modified LDR image which is applied to the transform. Thus, the path from the tone mapping function to the transform function will often include an encoding and decoding operation.

It will be appreciated that such encoding and decoding functionality can be implemented in any suitable way and in any suitable element. For example, for FIG. 2, it may be considered that the mapping unit 203 includes an encoding function and that the transform unit 205 includes a decoding function. As another example, the encoding and decoding functions may be included in the transform unit 205, or in the encoding unit 211 with the transform unit 205 being coupled to the encoding unit 211 and receiving the encoded/decoded LDR image therefrom. Thus the skilled person will realize that the various embodiments of the present inventions may include such options as: several ways to obtain the LDR image, several ways to construct any HDR improvement of an LDR picture, in particular by means of any co-encoded parametrized transform, and/or a simple correction function/image (exemplified by 209), which may e.g. be additive or multiplicative, pre- or post-, etc., several ways to encode any data relating to enhancing the LDR image to obtain an HDR version, etc.

It will be appreciated that references to an LDR image includes the various variations of the image, and specifically includes both a reference to the original tone mapped LDR image as well as to the encoded/decoded version thereof.

In the example of FIG. 2, tone mapper 203, the parameter processor 207 and the comparator 209 are all coupled to a multi-picture encoder unit 211. The multi-picture encoder unit 211 receives the LDR image, the transform parameter values and the compensation data and then proceeds to generate an output image coding signal.

The multi-picture encoder unit 211 is arranged to provide two or more pixelised picture structures for each image or frame that is encoded. E.g., it may typically in the first picture P1 of a set of pictures corresponding to a temporal image instant encode a regular LDR image with luma Y and color/chroma C data, and in the second picture, it will typically at least encode in the available chroma fields some HDR enhancement data eh_HDR, and the luma channel of P2 may be available (symbolized with xx) for something else, e.g. a second geometrical view for 3D applications, or other HDR information, such as e.g. a boost map, etc. The following will focus on an example wherein two pixelised pictures are provided for each image/frame but it will be appreciated that in other embodiments more pictures could be provided for each image.

Each picture is a pixelised array wherein information is provided for picture elements of the corresponding image. Thus, information is provided for the picture elements that make up the image when rendered. Each pixelised picture may specifically comprise an array of data sets with a data set (potentially) being provided for each pixel. Each data set may comprise a plurality of components and the components may be provided in accordance with a suitable representation.

Each pixelised picture may specifically be provided as a data structure with a number of N-bit words available for each pixel. For each spatial position of the image, a plurality of components is provided with each component being a data bit word.

In the example, each picture uses a representation that is consistent with encoding of a visual image, and specifically with an LDR image. Furthermore, the two pictures may follow the same format. E.g. the same number and size of data words may be provided for each pixel.

For each pixel, each picture may specifically provide M components in the form of M data words. Each data word may typically have the same number of bits N, although it is possible for the number of bits used for different components being different.

The pictures further use structures where different components are associated with different properties. Specifically, the pictures are provided with at least one component being a luma component and at least one component being a chroma component. The pictures may specifically be arranged as data arrays with one luma component and two chroma components for each pixel. E.g. the pictures may provide data in accordance with a YCrCb data structure.

In the example, the LDR image is accordingly encoded in a first pixelised picture. The encoded data is provided in accordance with a luma and two chroma sample values and specifically is in accordance with a YUV or YCrCB format.

The transform parameter values and the compensation values are encoded in a second pixelised picture. The second pixelised picture typically has the same structure as the first pixelised picture and may specifically have the same number of components (and specifically each component may be represented by the same N bit word). In the example, the two pixelised pictures have the same data structure and thus the second picture has at least one luma component and at least one chroma component corresponding to the luma and chroma component(s) of the first pixelised picture. Particularly, the second pixelised image may also have a data structure corresponding to a YUV or YCrCb format.

In the exemplary system of FIG. 2, the transform parameters are included in the luma component of the second pixelised picture and/or the compensation data (e.g. post-transform additive correction values) is included in a chroma component of the second pixelised picture. Thus, not only does the system provide combined data for both an LDR image and an HDR image but this is provided in a very efficient way. Specifically, the approach may be compatible with many existing operations and functionality.

Figure 4:
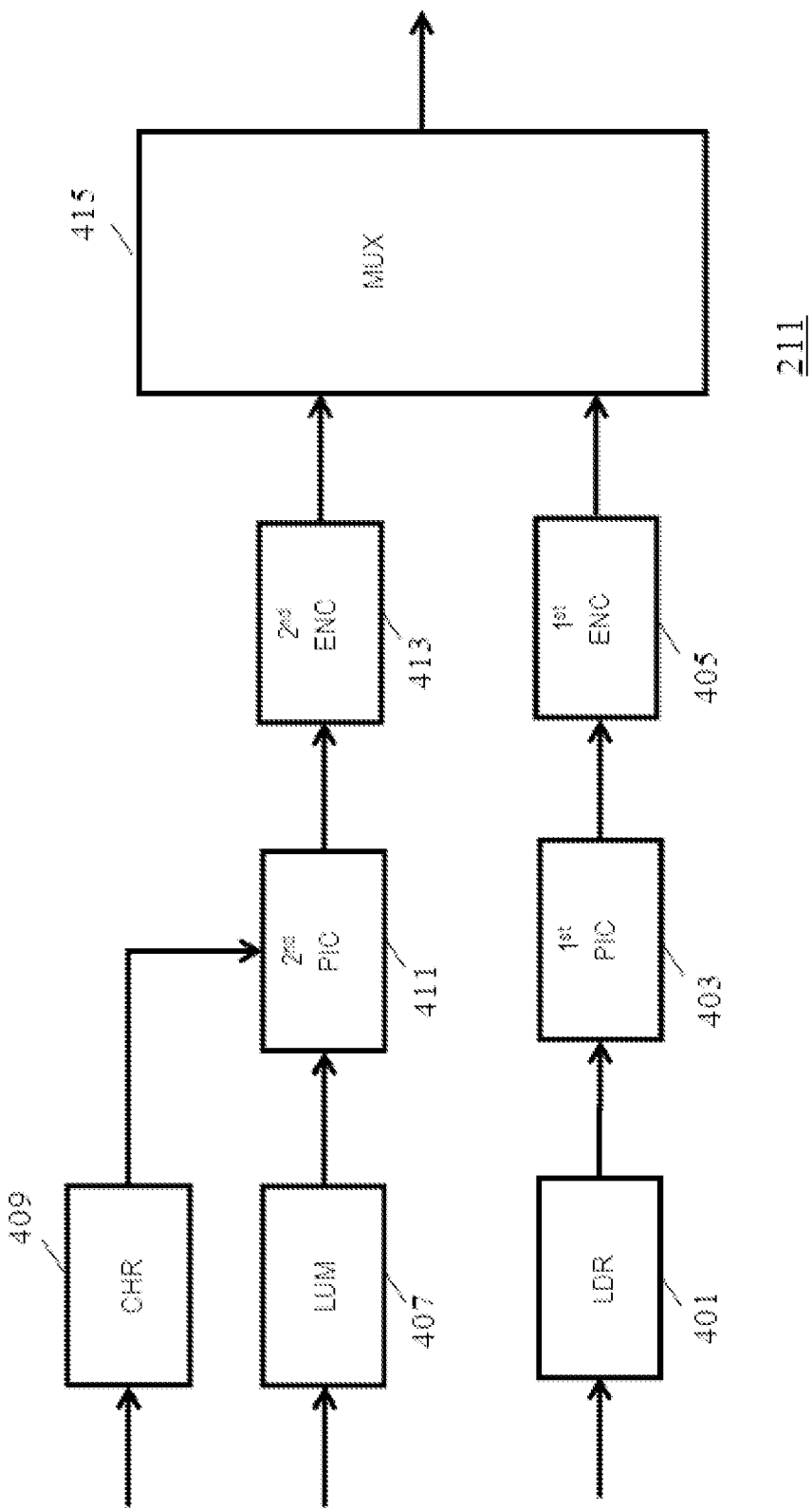
FIG. 4 illustrates an example of elements of an image encoder in accordance with some embodiments of the invention.

FIG. 4 illustrates an example of elements of a possible realization of the multi-picture encoder unit 211.

In the example, the multi-picture encoder unit 211 comprises an LDR input 401 which receives the LDR image from the tone mapping unit 203. The LDR image data are fed to a first picture processor 403 which includes the LDR image data in a first pixelised picture. Specifically, the LDR data is arranged as a data array of data sets with each data set comprising a luma component and two chroma components. Each component may specifically be an 8 bit value resulting in the first pixelised picture employing 24 bit per pixel (for a full chroma sampling density, such as in YUV444). It will be appreciated that in many embodiments, the tone mapping unit 203 may directly provide the data in the desired format, i.e. as a pixelised picture with e.g. an 8 bit luma sample value and two 8 bit chroma sample values, but of course the LDR picture may also come from a separate source (e.g. a memory containing the result of a previous LDR grading).

The first picture processor 403 is coupled to an optional first picture encoder 405 which is arranged to perform an encoding of the first picture (e.g. MPEG2 or AVC DCT-based encoding). The encoding typically introduces a significant compression resulting in a substantially reduced data rate. In order to achieve higher compression ratios, it is preferable that the encoder is lossy. However, this will result in the decoded LDR image at the decoder deviating from the LDR image from the tone mapping unit 403. Accordingly, the output of the first picture encoder 405 may in such embodiments be decoded to generate an encoded/decoded LDR image which is then fed to the transform unit 205 for use in the prediction of the HDR image.

The multi-picture encoder unit 211 further comprises a transform parameter input 407 which receives the transform parameter values from the parameter processor 207 and a compensation data input 409 which receives the compensation values (and specifically the error values) from the comparator 209. The transform parameter input 407 and the compensation data input 409 are coupled to a second picture processor 411 which is operable to generate a second pixelised picture which has the same data structure as the first pixelised picture but which comprises e.g. the transform parameters in a luma component and the compensation values in a chroma component. Specifically, the transform parameters may be included in the 8 bit luma data words and the error values may be included in the 8 bit chroma data words of one of the chroma components (or may possibly be included as 16 bit data words using both chroma components).

The second picture processor 411 is coupled to a second picture encoder 413 which proceeds to encode the second pixelised picture. It will be appreciated that in some embodiments, an encoder optimised for compressing the data in the second picture may be used. Also, typically a lossless encoder may be used to ensure that the data values are not modified (e.g. only mathematical encoding like run-length encoding; however, also some further lossy reduction could be possible). This may be particularly advantageous since the sensitivity of the HDR transform and/or compensation to errors may be relatively high. However, in some embodiments an image encoding process may be used by the second picture encoder 413, and indeed in some embodiments the same encoding algorithm may be used for both the first picture encoder 405 and the second picture encoder 413, although typically in view of the different nature of the data, different encoding techniques might be used, or at least different settings of parameters used in the encoding.

Such an approach would in particular be suitable for lossless encoding where e.g. the transform parameters could be reproduced exactly at the decoder. However, in some scenarios it may also be possible to use such an approach for lossy encoding. In particular, the transform parameters may in some embodiments be parameters that are relatively insensitive to errors. In such cases, the quantisation errors etc may result in a degradation which is however acceptable in most scenarios. For example, if the transform parameters indicate a luminance stretching factor, quantisation errors may affect the luminance stretching but still provide an improved (HDR) image. Also, if a HDR transformation profile is of low resolution, a relatively similar profile could be obtained from subsampling and interpolation, which could result in repackaged scaled down pictures, with many easily encodable zeroes in parts of those pictures. Similarly, compensation data in the form of residual data may not be sensitive to minor errors, and encoding errors may accordingly be acceptable in view of the data rate reduction. Thus, in some embodiments, it may even be possible to use an image encoding algorithm to encode non-image data and in particular to encode transform parameters and/or compensation data.

The first picture encoder 405 and the second picture encoder 413 are coupled to an output processor 415 which combines the encoded data from the first picture encoder 405 and the second picture encoder 413 into an output image signal. Specifically, the data from the two encoders 405, 413 may be multiplexed into a combined data stream.

Thus, the system of FIG. 2 generates an output image signal which comprises an optimised LDR image. In addition, specific information is provided describing how an HDR image can be generated from the LDR image. The HDR extension data is provided with reference to a dynamic range extension transform thereby providing a very efficient communication and a reduced data rate relative to a full HDR representation. For example, the original HDR image may consist of 16 bit per pixel which will require (around) twice the data rate for the LDR image. In contrast, the current approach may provide suitable dynamic range extension data using only e.g. 8 or 10 bit per pixel (e.g. 4 bits for a transform and 6 for a correction, or 8 for a correction) thereby substantially reducing the overhead of providing HDR information in addition to the LDR information. Further, the additional information is provided in a format that is compatible or requires very few modifications to existing standards or functionality. Thus, a high degree of backwards compatibility is achieved. This specifically allows for many existing audiovisual distribution systems and standards to easily be arranged to support HDR content.

In the example where the encoder is located in the content processing device 103 (e.g. a settopbox with local storage for storing several movies), the tone mapper 203 may typically be an automated process that does not involve any operator. However, it may select from an available spectrum of smart tone mappings, depending e.g. on analyzing video content for the present scene (e.g., if there are a lot of dark pixels in the HDR, which may have been brightened somewhat, the mapper may apply a bi-regional strategy, darkening the darker pixels, and putting highlights on an appropriate brightened luminance level). In other examples, the content processing device 103 may not include functionality for generating an LDR image from an HDR image. In such cases, the content processing device 103 may e.g. receive an input signal which comprises both the HDR and the corresponding LDR image. For example, a Blu-ray Disc™ may include both HDR and LDR versions of the audio-visual content. Thus, corresponding HDR and LDR frames may be provided. As yet another example, the content processing device 103 may not receive any HDR image but may only receive the LDR image as well as suitable dynamic range extension data. This may in particular be the case when both the path from the content provider apparatus 101 to the content processing device 103 and from the content processing device 103 to the display 107 use the described approach.

Figure 5:
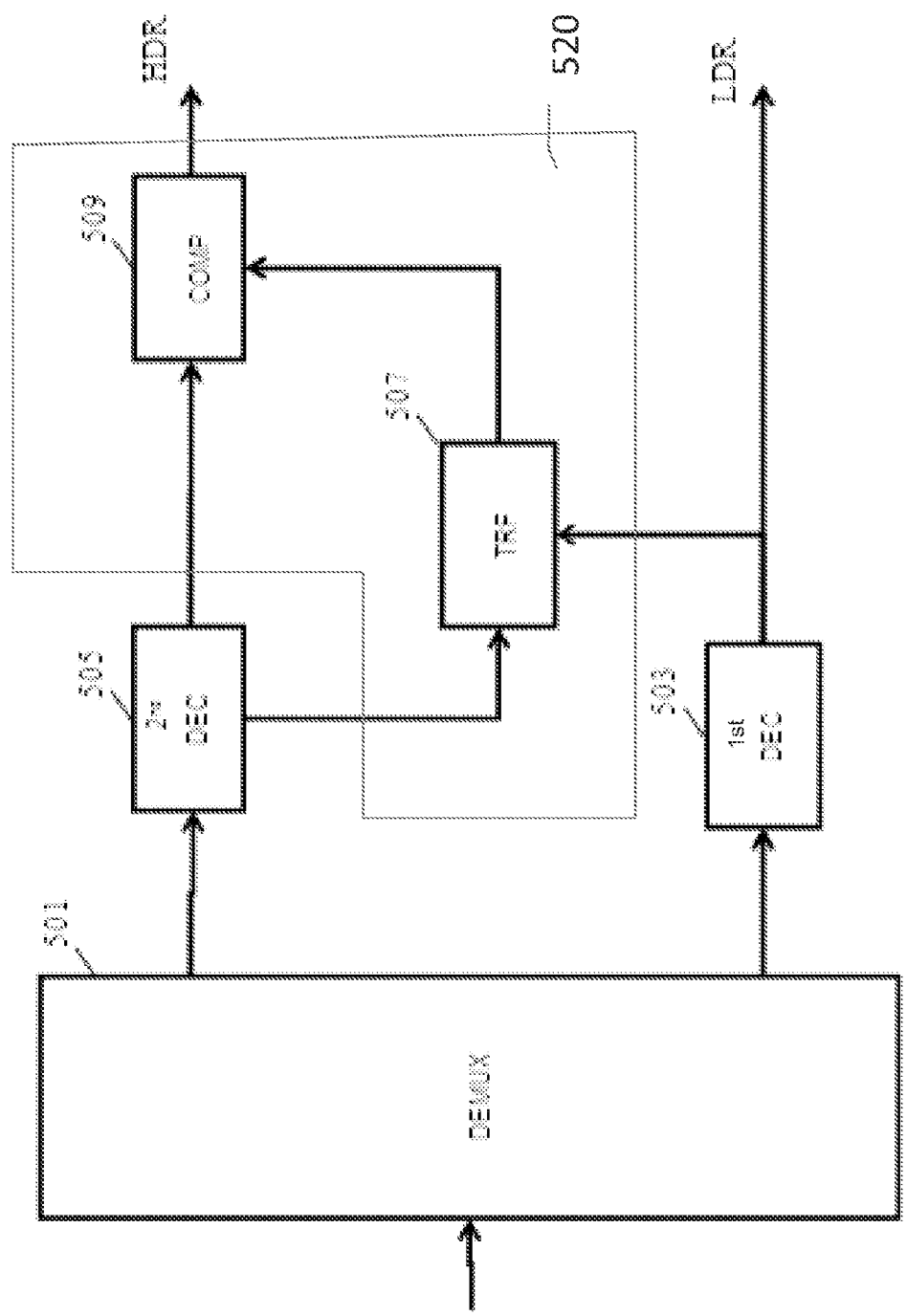
FIG. 5 illustrates an example of elements of an image decoder in accordance with some embodiments of the invention.

FIG. 5 illustrates an example of a decoder in accordance with some embodiments of the invention. The decoder of FIG. 5 is compatible with/complementary to the encoder of FIG. 2.

The decoder comprises a receiver 501 which in the specific example receives the image coding signal {P1 {...}, P2 {...}} from the encoder of FIG. 2. The receiver 501 extracts the encoded data corresponding to the first and second pixelised pictures. The decoder further comprises a first picture decoding unit 503 which is fed the extracted encoded data of the first pixelised picture. The first picture decoding unit 503 then proceeds to apply the corresponding/complementary decoding process to the encoding process of the first picture encoder 405. The first picture decoding unit 503 thus generates the LDR image which may be e.g. be used to provide an LDR image by LDR equipment. However, the decoder of FIG. 5 further comprises functionality for generating an HDR image.

Specifically, the decoder further comprises a second picture decoding unit 505 which is fed the extracted encoded data of the second pixelised picture. The second picture decoding unit 503 then proceeds to apply the corresponding/complementary decoding process to the encoding process of the second picture encoder 413. The second picture decoding unit 505 thus generates the second pixelised picture which comprises the transform parameter values in the luma component and the compensation values in the chroma component.

The decoder comprises an HDR transform unit 507 which is coupled to the first and second picture decoding units 503, 505. The HDR transform unit 507 receives the LDR image from the first picture decoding unit 503 and the transform parameters from the second picture decoding unit 505. It then proceeds to adapt the dynamic range extension transform in accordance with the provided transform parameters. Thus, the HDR transform unit 507 applies the same transform as was applied by the transform unit 205 for the given parameter values (assuming lossless encoding of the LDR image or the transform unit 205 using an encoded/decoded LDR image corresponding to the decoder). Accordingly, the HDR transform unit 507 generates an HDR image.

The decoder further comprises a compensation unit 509 which is coupled to the second picture decoding unit 503 and the HDR transform unit 507. The compensation unit 509 receives the HDR image from the HDR transform unit 507 and the compensation data from the second picture decoding unit 503. The compensation unit 509 then applies the compensation data to provide a compensated HDR image. For example, an extracted error image may be added to the predicted HDR image generated by the HDR transform unit 507. The resulting HDR image can then be rendered by suitable HDR equipment.

In the example, the compensation data is post-compensation data which is applied to the output of the transform. However, it will be appreciated that alternatively or additionally, the compensation data may be pre-compensation data which is applied to the LDR image prior to the transform. For example, the encoder of FIG. 2 may comprise functionality for determining which colour compensations should be applied to the LDR image in order to result in an HDR image after the transform which is preferred. The encoder may for example use a mathematical optimization approach, or the pre-compensation data may be guided manually by an operator. In a corresponding decoder, the pre-compensation in accordance with the pre-compensation data (e.g. a colour offset for each pixel) may be performed on the LDR image. The resulting LDR image may then be fed to the HDR transform unit 507.

It will be appreciated that in different embodiments, different transforms may be used and that different transform parameters may be used depending on the specific requirements and preferences of the individual embodiment.

In some embodiments, the transform parameters may be a gain or scaling factor that is applied to the LDR pixel value to generate the (predicted) HDR pixel value. For example, the LDR values may be provided as 8 bit values representing the interval [0,1] and the gain or scaling factor may be a multiplicative factor that allows the HDR to e.g. by 12 bit values in the range from, say, [0,10] (referring to the same colour representation). Thus, a much wider representation can be achieved.

The scaling or gain factors may be fractional values that are multiplied with the individual sample value for each pixel.

In some embodiments, a scaling or gain factor may be provided for, or relate only to, one of the components of the LDR image. For example, if the LDR image is provided in a YCbCr format, the scaling factor may only be provided to the luminance channel Y.

The provision of a scaling parameter may thus be used to describe how the HDR image can be generated from the LDR image. The approach further allows for a very substantial luminance dynamic range extension and can specifically increase this by a factor of five, ten or even hundred times (or more).

The gain parameter may be provided for each individual pixel and may be encoded as an 8 bit value in the corresponding 8 bit data word of the luminance colour component of the second picture.

Coding efficiency may be gained in various ways, including for example only providing luminance gain factors, i.e. providing the gain factor for only the luminance component of the LDR image. Also, specific gain values may only be provided for some pixels. For example, for large parts of a given image, a relatively accurate HDR image may be generated using a standard scaling factor (specifically applying no scaling, i.e. a gain factor of 1). For these pixels, no gain factor is provided and thus the gain factor is only provided for e.g. very bright areas of the image wherein the increased dynamic range is exploited.

The transform is arranged to provide a gamut for the HDR image which is larger in the luminance direction than the first image. The transform is arranged to provide a larger set of luminance values intended for displays that are able to produce higher brightness and contrast levels. Of course, further transformations in chromatic directions may also be specified (e.g. in available components or pictures, or as metadata).

The transform parameter may be indicative of a strength of the dynamic range extension. For example, a standard transform that boosts the dynamic range of the pixels of the LDR image may be defined and the output HDR pixel may be generated as a weighted sum of the transform output (i.e. a boosted pixel) and the original LDR pixel:

$$Y_{HDR} = Y_{LDR} + N \cdot f(Y_{LDR})$$

where $f(Y_{LDR})$ represents a possibly fixed transform applied to the LDR luminance value. Similarly, by making a subsampled array of e.g. 2×2 weights, one can mix several transforms to obtain the desired HDR look.

E.g. the luminance component of the second image may then provide the value N. For N=0, the output HDR pixel corresponds directly to the input LDR pixel.

FIG. 6 illustrates an example wherein such weight values are provided in the second picture. The figure illustrates the data values of the luminance component of a section of the second picture. The example corresponds to a small image area wherein a very bright light source is rendered much brighter in the HDR image than possible in the LDR image. In the centre of the light source, N is equal to five resulting in a very strong luminance increase (e.g. the HDR pixel is dominated by the transform) whereas this tails off towards the edge of the light source. The approach thus provides spatial information that can adapt and improve the HDR generation. It should also be noted that the default value of N=0 in many scenarios may not be encoded thereby improving coding efficiency.

It will be appreciated that the compensation value may relate to different properties in different embodiments. In many embodiments, the dynamic range extension compensation data may be an additive correction value that is added to the result of the dynamic range extension transform. For example, after applying the scaling factor or generating the weighted sum HDR pixel output, the compensation value comprised in a chroma component may be added. Thus, the output of the transform can be further refined by use of the compensation data provided in the chroma component.

Such an approach provides e.g. the content provider with a lot of flexibility and control over both the LDR image and the resulting HDR image. Indeed, it may allow the content provider to provide an artistic optimisation/tone mapping for both the LDR and HDR images while at the same time allowing coding efficiency and the conversion being based on e.g. partly predetermined transformations. In particular, the conversion from an LDR image optimised for LDR presentation to an HDR image can be based on generic or predetermined transforms thereby providing reduced complexity, computational efficiency, facilitated implementation and/or reduced coding efficiency. At the same time a high degree of control can be provided over the resulting HDR image by flexibly, locally and spatially adapting the transform and/or compensating the output of the transform.

For example, a colour grader may generate an LDR image from the HDR image. When doing this, the colour grader uses his expertise and judgement to carefully optimise the image for LDR. Thus, on his system he will spend time carefully boosting or diminishing the luminance in different areas, modifying the colour tone (chroma) etc. He may then apply the generic transforms to the resulting optimised LDR image thereby generating an initial HDR image. The colour grader can then proceed to modify and adjust the transform parameters and/or compensation values to modify the resulting HDR image. This adjustment can be based on the original HDR image e.g. by the colour grader manually comparing the transform result to the original HDR image. However, the colour grader may also provide subjective or artistic adjustments to generate an HDR image which is considered an improvement on the original HDR image. The resulting transform parameters are then included in the luminance component of the second picture and the compensation values are included in a chroma component.

In some embodiments, the dynamic range extension compensation data comprises pixel value error values for the first image and these pixel value error values may be indicative of a (weighted) difference between image pixel values of the increased dynamic range image and image pixel values of a corresponding input high dynamic range image. The transform may generate an HDR image which is a prediction image (an estimated image for the HDR image) and the error values may be generated to reflect the discrepancy between such a prediction image and the original ("correct") HDR image. Thus, the transform is a prediction function providing an estimate of the original HDR image from the LDR image. The transform parameters may in such an example be parameters providing a local adaptation of the prediction function. The error values thus reflect the difference between the prediction and the original HDR image. (In some embodiments, the original HDR image may be replaced by a modified version of the HDR image.)

Specifically, the compensator 209 may generate the error values by for each pixel subtracting the Y value of the original HDR image from the Y value of the transform HDR image from the transform unit 205.

The error values may be provided directly and thus have equal weighting, and may in particular directly be the calculated difference. However, in other examples, the error values may be weighted e.g. by the difference values being scaled differently. As another example, a non-linear weighting may be applied resulting e.g. in the N bit data word in the chroma component corresponding to a non-linear quantisation of the difference value.

The previous examples have focussed on the dynamic range extension compensation data providing luminance error or difference values. However, in some embodiments, the dynamic range extension compensation data may alternatively or additionally comprise colour (chroma) compensation data. Specifically, the dynamic range extension compensation data may comprise colour saturation compensation data.

Indeed, in many embodiments, the dynamic range extension may result in a changed perception of the saturation of different colours. For example, an image object may in the LDR image be perceived with a given colour saturation whereas the same chroma value may be perceived to be a different colour saturation following the boosting of the luminance for the image object. Such perceptual effects can be addressed by the compensation values reflecting a chroma adjustment and specifically a saturation adjustment.

In some embodiments, the dynamic range extension compensation data comprises both luminance and chroma compensation values. In particular, the colour saturation compensation data may be provided in one chroma component of the second picture with luminance compensation data being provided in another chroma component. This may allow a very efficient and flexible system allowing the source to have a tight control over the HDR image that can be generated by the sink. For example, the content provided may accurately control the HDR image generated at the consumer side as both chroma and luminance effects can be effectively communicated. Further a facilitated operation and improved reuse/backwards compatibility is possible, e.g. allowing the luminance and chroma information to easily be extracted and applied. The color modification transforms/data can be relatively simple if partially modeled on the luminance transformations (and taking into account e.g. display gamut shapes).

The previous examples have focussed on embodiments wherein the dynamic range extension data includes both dynamic range extension compensation data and data representing one or more parameters for a dynamic range extension transform. However, it will be appreciated that in some embodiments, the dynamic range extension data may include only one of these.

For example, in some embodiments only transform parameter data may be provided in the luminance component without any compensation data being provided in a chroma component. This will allow e.g. the prediction to be adapted to the specific image characteristics while still allowing chroma components that can be used for other data (or not be used, thereby resulting in a lower data rate). Further reduced complexity and reduced computational resource usage may be achieved since no processing of compensation data is required. These benefits may in some embodiments outweigh a possible reduced quality of the resulting HDR image.

As another example, the transform may in many embodiments be a predetermined, and possibly fixed, transform for which no adaptation parameters are provided. Thus, the decoder may apply a standard fixed transform to generate a base HDR image. This HDR image can then be modified and adapted by the use of compensation data. In such embodiments, no transform parameters are accordingly communicated in the luminance component of the second picture and only the compensation data in the chroma component is provided. This may reduce the data rate, complexity, resource usage etc albeit at a possibly reduced resulting image quality or originator control compared to systems providing both the transform parameters and the compensation data.

As another example, the transform function may be an adaptive transform which however is not dynamically and locally updated. Rather, the parameters of the transform, or indeed a definition of the transform itself, may be provided in metadata that is e.g. included in the signal but not in the second picture.

In some embodiments different sets of dynamic range extension data may be provided in different components of the second image. The different sets may be alternative sets and may be independent of each other. For example, a plurality of sets of transform parameters may be provided in the different components of the second picture, where each set may describe an alternative transform to be applied to the LDR picture. Thus, suitable HDR equipment may choose between the different alternative sets to select a desired transform.

Similarly, two different sets of compensation data may be provided in different components of the second picture. For example, a first set of difference values may be provided corresponding to the difference between the transform HDR image and the original HDR image (e.g. as captured by a camera), a second set of difference values may be provided corresponding to the difference between the transform HDR image and a manually generated subjective (artistically enhanced) HDR image. The HDR equipment may then choose which of the two sets to use when generating the HDR image. In this way one doesn't only have information as two how the two LDR vs. HDR gradings relate to each other, but also how they relate to e.g. a (pseudo)linear coding of the original captured scene.

As another example, different sets of compensation data may be provided corresponding to alternative transforms. For example, a first chroma component may comprise prediction error data corresponding to a first prediction function, and the second chroma component may comprise prediction error data corresponding to a second prediction function. Different HDR receiving apparatuses can then select a more appropriate function, because it (e.g. a relighting modeling function) corresponds more to the display capabilities, or is a function present in the set of functions in the image processing IC of the receiving apparatus, etc.

As yet another example, a first chroma component of the second picture may comprise pre-compensation data for the transform and a second chroma component may comprise post-compensation data for the transform. Thus, a first chroma component may e.g. comprise compensation data for the LDR image prior to the transform being applied, and the second chroma component may provide compensation data for the resulting predicted HDR image. The compensation values may be related to the same properties or may possibly be related to different properties. For example, the pre-compensation data may be saturation adjustment data operating in the chroma plane or on the three or more color components of the LDR pixels, and the post compensation data may be luminance data operating in the luminance direction.

Thus, in some embodiments, the second picture may comprise a plurality of sets of dynamic range extension compensation data in different components. Specifically, the second picture may e.g. comprise two error images (e.g. one in the Cr component and one in the Cb component). The corrections may be used with the same transform (e.g. before and after a power law), or could be used with different transforms.

Alternatively or additionally, the second picture may in some embodiments provide different transform parameters that describe (or define) different transforms. For example, the transform parameters of the luminance component may apply to a simple dynamic range extension transform, such as a simple scaling (boost) or power law transform. In addition, transform parameters for a very complex and computationally demanding transform may be provided in a chroma component of the second picture (e.g. an algorithm that is not just considering the pixel itself but also other pixels in a neighbourhood area of the pixel, e.g. by applying a spatial filtering or edge enhancement). A given HDR equipment can then choose between a low complexity and less accurate HDR extension and a more accurate but more computationally demanding HDR extension. The selection may simply be based on the capabilities of the equipment.

As another example, the two transforms (or indeed the two compensation sets) may correspond to different preferences for the HDR generation. Thus, the two approaches may lead to different HDR images and e.g. a user may be able to manually select between these based on his personal preference. For example, the different sets could correspond to different tone mappings.

As another example, the different sets may be optimized for different characteristics of the HDR rendering, such as for different display technologies. For example, one set may be optimized for display on an LCD display whereas the other set may be optimized for rendering by a DLP projector.

It will also be appreciated that the multiple sets need not be complete. For example, the luminance component may comprise transform parameters for a low complexity transform for the entire image. A chroma component may comprise transform parameters for a very complex and resource demanding transform. However, the chroma component may only provide such transform parameters for a subset of the image. For example, it may only be provided for specific areas that justify the more complex processing. E.g. complex transform parameters are only provided for image areas corresponding to people's faces. In some embodiments, the transform parameters (or equivalently the compensation values) may only be adapted to specific image characteristics. For example, they may correspond to a specific optimization of HDR conversion of human faces, and therefore the data is only provided for image areas that correspond to human faces.

The first and second pixelised pictures may in some embodiments be compatible with a multi-view image representation. Indeed, an image coding signal format suitable or created for representation of multi-view images, such as three dimensional and specifically stereo images, may alternatively or additionally be used to represent both an (LDR) image and data for controlling the generation of an increased dynamic range image therefrom.

For example, the first and second pixelised pictures may each comprise a luminance and two chroma components corresponding to e.g. an YCrCb representation for the right and left images of a three dimensional stereo image. However, instead of using the stereo image format for a stereo image, the format may be used to provide an LDR image in the first picture and dynamic range extension data in the second picture as previously described. In particular, the Y component may provide transform parameters and one or both of the chroma components may provide error data.

In some embodiments the second pixelised image may comprise dynamic range extension data or second view image data. Thus, the same signal format can be used for two completely different purposes while maintaining a lot of compatibility and commonality thereby resulting in facilitated operation and increased reuse of functionality. Indeed, much functionality has been developed for distributing and handling signals for multi-view images. The described approach allows such functionality to be used for handling dynamic range extension data, and specifically for distributing LDR images together with information of how to generate LDR images. Thus, introduction of HDR capability can be substantially facilitated as existing formats and functionality can be reused with only the end circuitry (i.e. the HDR equipment) needing to be able to specifically handle HDR extension data.

In such embodiments, the image coding signal can comprise an indication of whether the second pixelised image comprises the encoded second image or the dynamic range extension compensation data. This may provide a low complexity approach allowing a common format to be reused for different purposes while still allowing the specific data to be processed appropriately.

In some embodiments, the second pixelised picture may comprise data representing both a second view image and dynamic range extension data. For example, the first picture may comprise an LDR representation of a left eye view. A first component may comprise image data for a right eye view and a second component may comprise dynamic range extension data.

For example, the luminance component of the second picture may comprise luminance data for a right eye view of a three dimensional image (with the first picture providing a full colour representation of the left eye view). A 3D rendering device will then be able to generate a colour image for the right eye view based on the colour information from the left eye view (e.g. matching pixels between the two views may be found using any suitable algorithm as will be known by the skilled person. The matching pixels in the second view image can then be assigned the same chroma value as the pixels in the first view image. Any remaining pixels can be assigned a colour value based on interpolation in the second view image). This allows for a full colour 3D image to be rendered.

At the same time one (or more) of the chroma components may comprise dynamic range extension data. For example, a first chroma component may comprise transform parameters or compensation data (e.g. error values). This allows the LDR image of the first picture to be transformed into an HDR image.

In some embodiments, transform parameters may be provided in the luminance component of the second picture and luminance data for the second view image may be provided in a chroma component of the second picture.

In many embodiments, the second pixel picture may comprise both image data for a second view image, transform parameters for a dynamic range extension transform, and compensation data for the transform. Indeed, a second image with three components may provide second view image data in one component, transform parameters in another component, and error data in a third component. Specifically for a YCrCb representation, the Y component may provide transform parameters, the Cr component provide luminance pixel values for a second view image, and the Cb component provide error compensation data for the HDR transform.

The specific formats that are used in different embodiments may vary and depend on the individual preferences and requirements of the embodiment. In particular, the way the signal is carried depends on the specific distribution medium.

A widely used approach is to base video signals on an AVC video coding scheme as defined in ITU-T Rec. H.264 and ISO/IEC 14496-10. In some embodiments, an approach similar to that which is used for encoding a stereoscopic 3D video stream with Multiview Video Coding (MVC) is used for HDR data. MVC is an amendment to H.264/MPEG-4 AVC video compression standard developed with joint efforts by MPEG/VCEG that enables efficient encoding of sequences captured simultaneously from multiple cameras using a single video stream.

MVC is based on using AVC encoding but extending it such that two video streams are encoded: a 2D (or left eye stream) and an enhancement video stream (the right eye video stream). The enhancement stream is encoded dependent on the 2D stream, thereby further improving the coding efficiency.

In some embodiments, a similar approach is used for HDR data where HDR enhancement data (transform parameters and/or correction data) is embedded into the MVC enhancement stream such that the information in the HDR enhancement stream (the second pixelised picture) act as a correction to the base layer stream that carries the LDR video (the first pixelised picture).

It should be noted that MVC is not limited to a stereo view but may include more than two different views. It will be appreciated that such additional views may be used for HDR data and specifically for transform parameters and compensation data. It will also be appreciated that such additional views could be used to provide stereo (or multi-view) HDR images. For example, different MVC view streams may comprise transform parameters and compensation data for HDR images corresponding to different views.

AVC has defined a special metadata container specifically for additional signaling information related to the encoded video. This metadata container is called the Supplemental Enhancement Information message abbreviated to SEI message. The SEI message is carried in separate data blocks together with the video data in a stream.

An H.264 stream is built up of NAL units (Network Abstraction Layer). In AVC several different types of NAL units are defined, for example a NAL unit which contains the coded picture data and a NAL unit that contains the SEI messages. Several of these NAL units together form an access unit. In an access unit, all the data required to start decoding and presenting one or more video frames is available.

Figure 7:
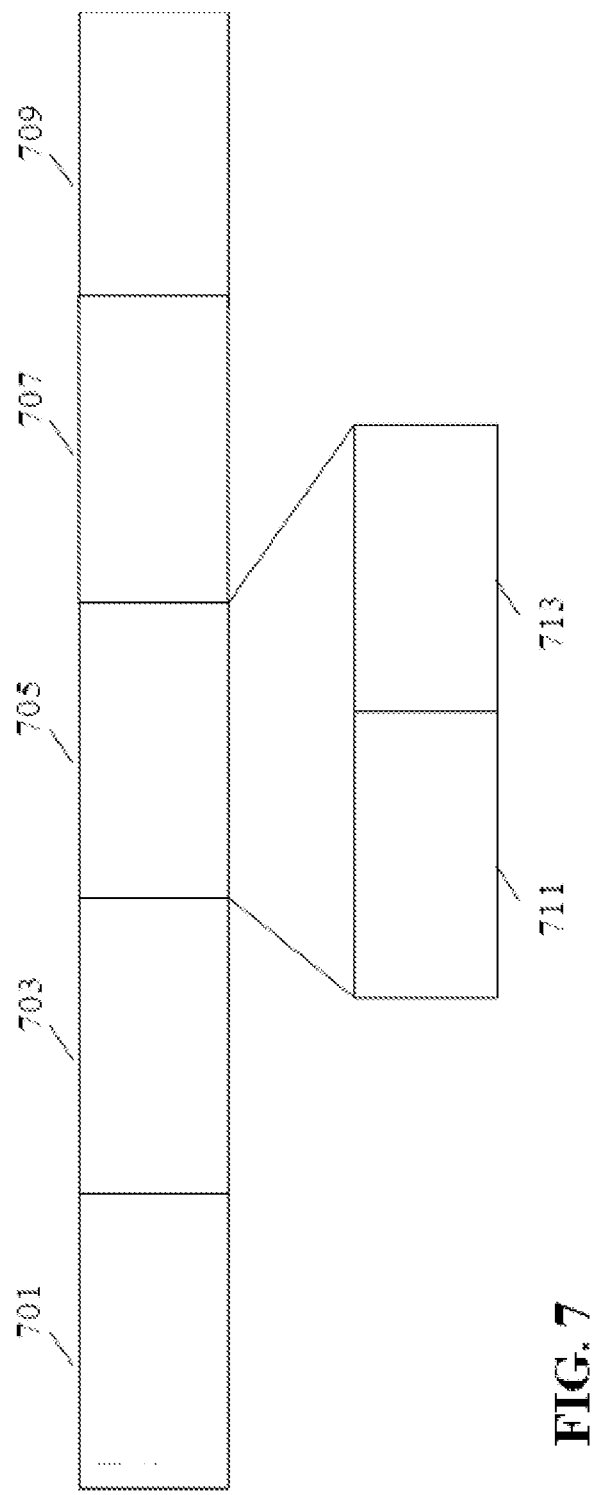
FIG. 7 illustrates an example of an access unit for an AVC stream in accordance with some embodiments of the invention.

An example of an access unit is shown in FIG. 7. The access unit comprises the following blocks:

701 NAL indicating Start of AU unit

703 Other NAL units

705 SEI NAL units

707 NAL units containing coded picture data

709 End of sequence

Each SEI NAL unit further comprises the following blocks:

711 HDR Enhancement message

713 Other SEI messages

The SEI message syntax for carrying the HDR enhancement message may specifically be as follows:

| | No of bits | type |
|---|---|---|
| HDR_enhancement_message(payloadsize) { | | |
| Marker bit | 1 | |
| Reserved_for_future_use | 3 | |
| Frame_rate | 4 | |
| PTS | 32 | |
| Number_of_operations | 4 | |
| Reserved_for_future_use | 4 | |
| Number_of_frames_in_GOP | 8 | |
| For (operator_sequence_id=0; operator_sequence_id< Number_of_operations; operator_sequence_id++){ For(frame_num=0; frame_num< number_of_frames_in_GOP; frame_num++;) { | | |
| operator | 8 | |
| } //end of frame_num | | |
| } //end of operator_sequence_id | | |
| } | | | where the following fields are used:
Marker bit: Set to a predetermined value to indicate HDR (e.g. is set to 1)
Frame_rate: This field indicates the number of frames per second in this video stream
PTS: This field indicates the Presentation Timestamp (PTS) of the first frame in the Group of Pictures (GOP) in 90 khz clock as defined in ISO 13818-(1).
Number_of_operations: The number of operations (corrections) to apply to all the pixels in the frame.
Number_of_frames_in_GOP: The number of frames in this group of pictures (GOP)
Operator: 8-bit value that defines the operation to apply to the YCbCr pixel values of the LDR video in the base stream. Thus, this value specifies which dynamic range extension transform to be used. It may thus allow a large number of different transforms to be predefined with the operator value indicating which specific one of the possible transforms should be used. In the presence of a plurality of operator fields, the different transforms may in some embodiments be alternative or may in some embodiments by combined operations, i.e. the LDR to HDR transform may be defined as the combined effect of performing the operations defined in the operator field.

Some possible operator values with corresponding operations are listed in the table below:

| Operator value | operation |
|---|---|
| 1 | Multiply the Y pixel values of the LDR picture with the Y pixel values of the correction picture. I.e. the luminance value of the second picture is a scaling or gain factor for the LDR luminance value of the first picture. |
| 2 | Multiply the Cr pixel values of the LDR picture with the Y, Cr or Cb pixel values of the correction picture. The transform may include a chroma adjustment based on data included in the second picture. |
| 3 | Multiply the Cb pixel values of the LDR picture with the Y, Cr or Cb pixel values of the correction picture. The transform may include a chroma adjustment based on data included in the second picture. |
| 4 | Apply a Gamma correction to the LDR picture using as gamma value the Y pixel value of the correction picture. The luminance component of the second pixelised picture thus defines the gamma value for the LDR pixels. |
| 5 | Substract the Cr and Cb values of the second picture from the Cr and Cb values of the LDR picture. |
| 6 | TBD |
| 7 | TBD |

It will be appreciated that the transform/dynamic range extension can be performed in many different devices and entities dependent on the specific embodiment. For example, the transform and compensation may be performed in the playback device (e.g. set top box) or in a display (e.g. television). E.g. an LDR to HDR conversion may be performed in a playback device if this supports the processing capabilities and the video interface to the display supports transmission of HDR video. If the playback device or the video interface to the display does not support direct transmission of HDR content then the HDR enhancement signalling in the SEI messages must also be transmitted to the display together with the LDR- and enhancement picture data. I.e. in this case the communication of the signal to the display may be in accordance with the principles previously described.

The communication of video signals between devices, such as between a set-top box and a display, is typically in accordance with a suitable standard. Two currently popular and promising video interface standards are the HDMI (High-Definition Multimedia Interface) and DisplayPort video interface standards. The described approach is particularly suitable for such video interface standards.

Signalling in video interface standards such as HDMI and DisplayPort is based on CEA 861-D. CEA861-D defines the concept of an infoframe. This info frame is transmitted in so called data islands, "blanking interval" periods in the video transmission. The blanking interval is a concept originating from the analog CRT (Cathode Ray Tube) display where the cathode ray required some time to retrace back to the draw a line. In HDMI these vertical and horizontal blanking periods are used to transmit audio and control data. Control data in HDMI is transmitted in infoframes and these are limited to 30 bytes.

For signalling HDR correction or "enhancement" data such an infoframe can be defined. Thus, an indicator of the presence of dynamic range extension data as well as possibly various characteristics associated therewith can be provided in a suitable infoframe. This can specifically carry the same data as defined for the HDR enhancement SEI messages above. However, the timing and indication of frame number is different in HDMI than in MPEG.

A possible info frame definition for a HDMI vendor specific Data block HDR may be as follows:

| | Packet Byte # | | | | | | | |
|---|---|---|---|---|---|---|---|---|
| | 7 | 6 | 5 | 4 | | 3 | 2 | 1 | 0 |
| PB0 | | | | Not relevant | | | | Length |
| PB1 | | | | 24 bit IEEE registration identifier | | | | |
| PB2 | | | | | | | | |
| PB3 | | | | | | | | |
| PB4 | | | | Not relevant | | | | |
| PB5 | | | | | | | | |
| PB6 | | | | Not relevant | | | | |
| PB7 | | | | | | | | |
| PB8 | | Not relevant | | HDMI_HDR_present (Indicates that dynamic range extension data is present.) | | | | |
| PB9-15 | | | | Not relevant | | | | |
| PB16 | | | | HDR_correction_param (Defining or describing which dynamic range extension transform to use) | | | | |
| PB (length) | | | | | | | | |

For transmission of HDR correction or enhancement data in HDMI and DisplayPort, a mechanism may be used which is similar to that defined for the stereoscopic 3D formats whereby the left eye picture data and the right eye picture data are transmitted in one "frame" period with an extended size. This approach is illustrated in FIGS. 8-11.

Figure 8:
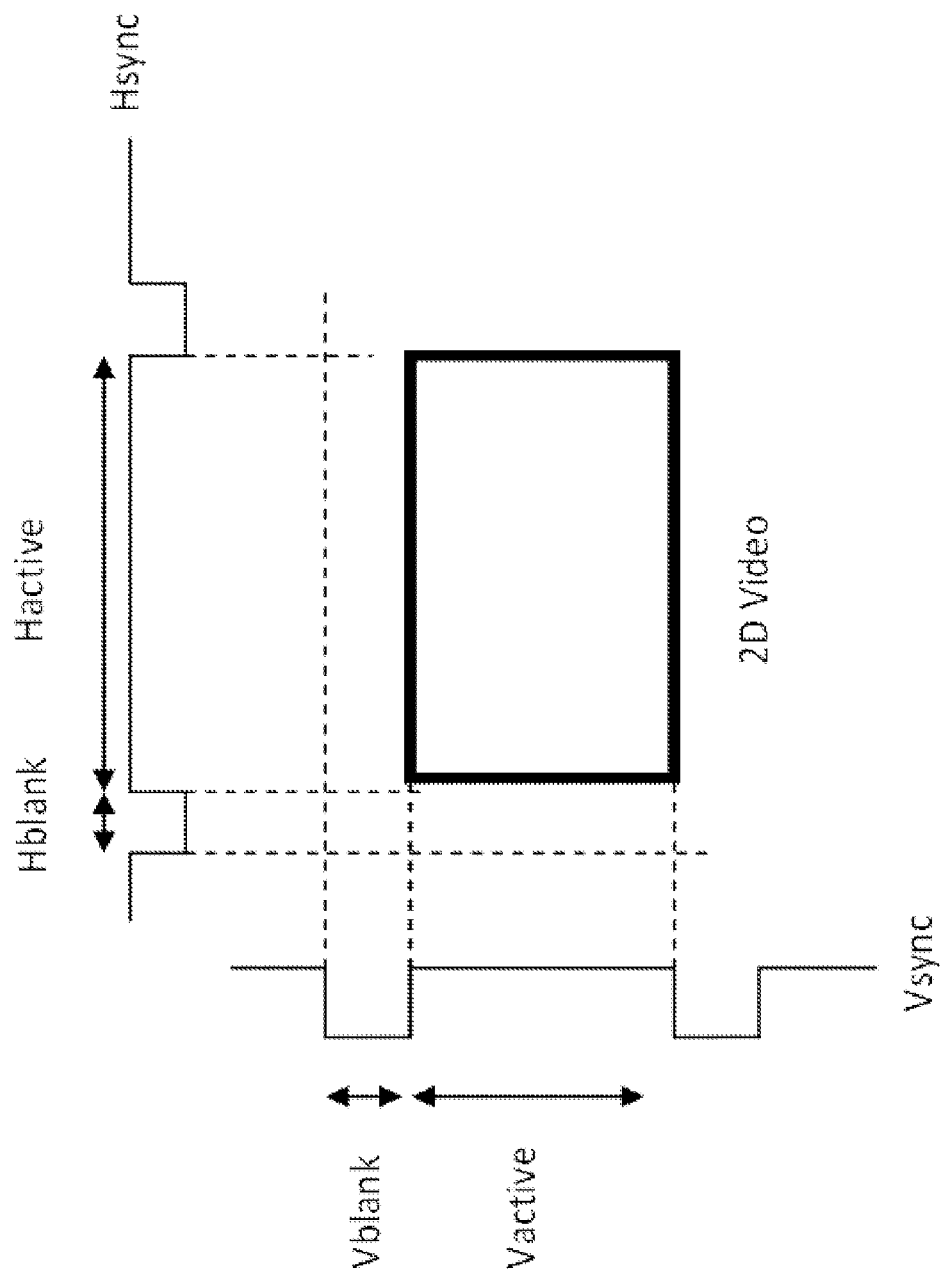
FIGS. 8 and 9 illustrate an example of a format for communicating stereoscopic images in accordance with prior art.
Figure 9:
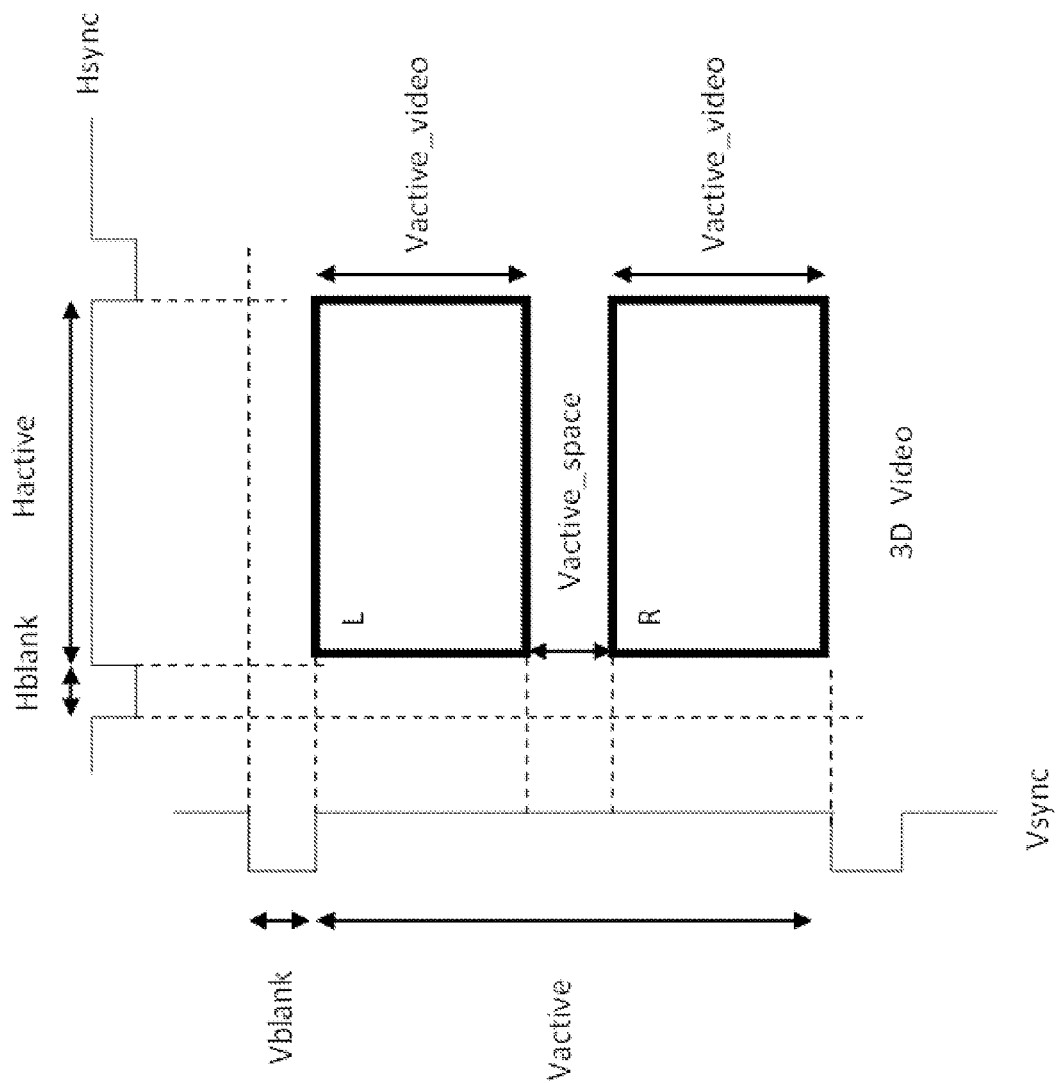
Figure 10:
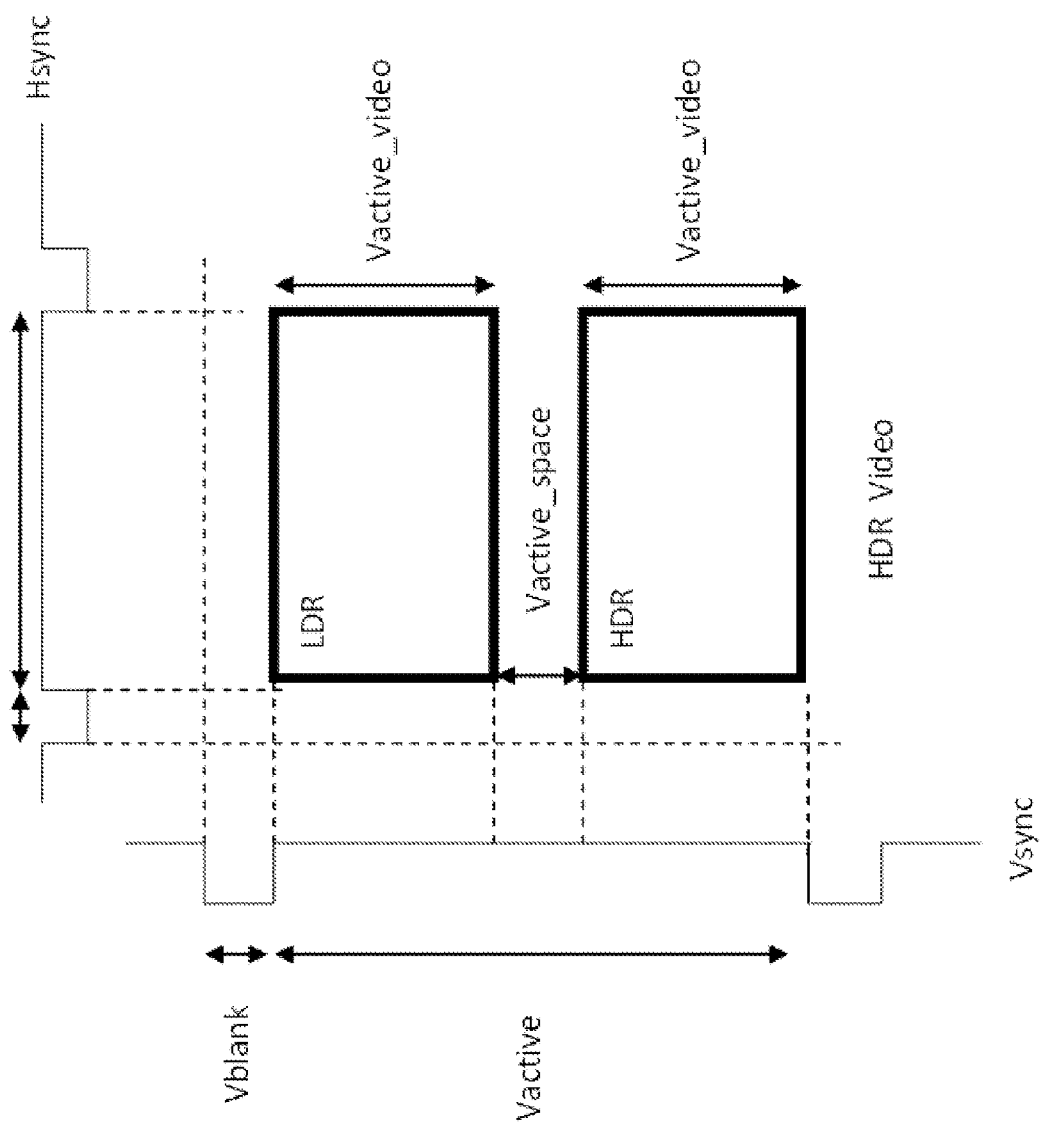
FIGS. 10 and 11 illustrate an example of a structure for communicating LDR and HDR images in accordance with some embodiments of the invention.
Figure 11:
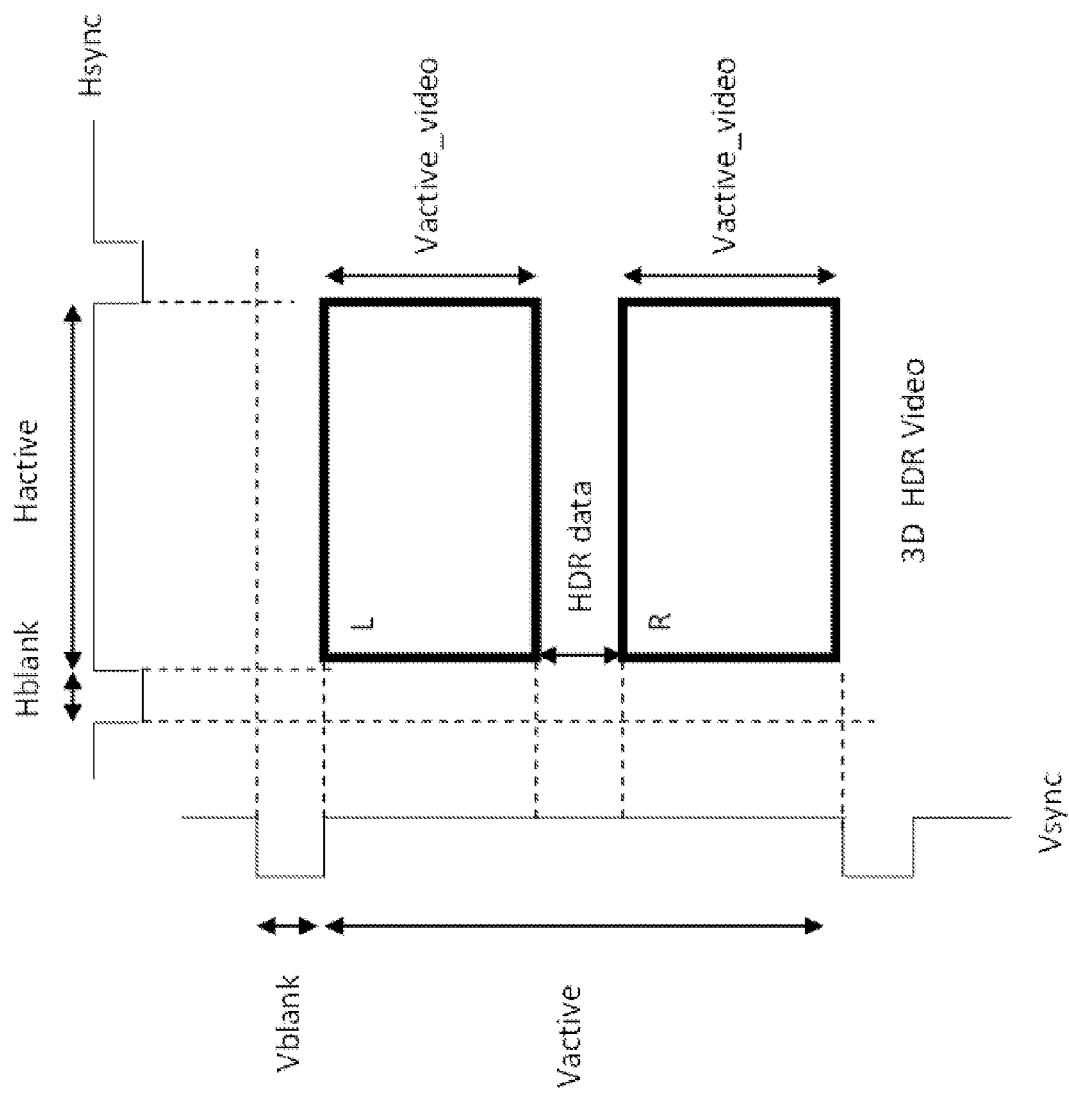

FIGS. 8 and 9 illustrates the prior art approach for stereoscopic images. FIG. 10 illustrates an example applying related principles to HDR enhancement data. FIG. 11 illustrates an example of how stereoscopic and HDR enhancement data can be combined.

I.e., according to the present embodiments, one can encode HDR data both in places for pictures, and in surrounding data places.

It will be appreciated that the described system may be used with many different types of content creation, provision and consumption including for example consumer systems.

Figure 12:
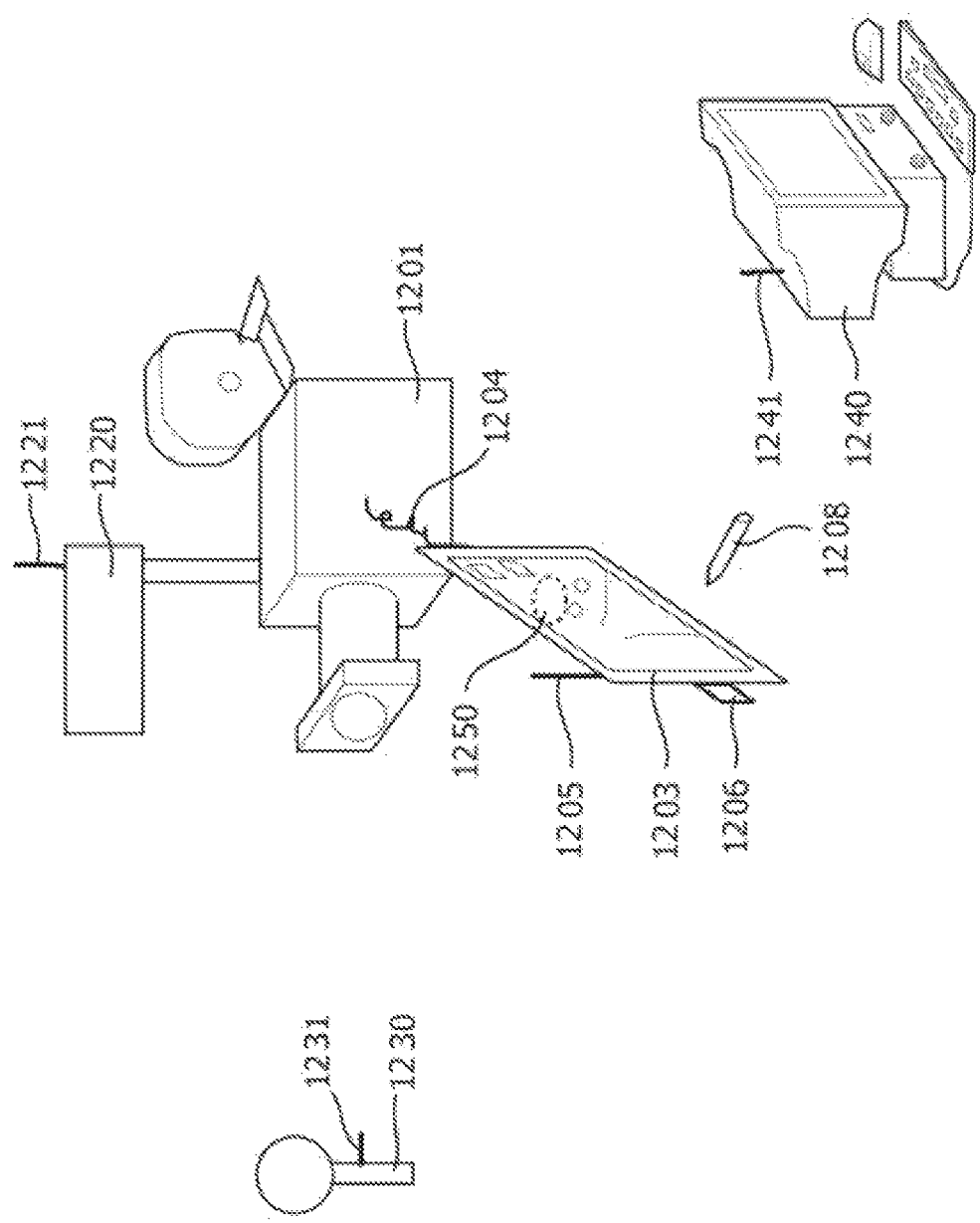
FIG. 12 illustrates an example of a system for generating audiovisual content.

FIG. 12 schematically shows an example of some of the apparatuses that may be present at the creation (transmission) side to be used for creating a good HDR signal. In the example, the apparatuses are integrated with a classical celluloid film camera (note that the digital assisting representation of the scene will only fully [as to the pixel values of the analog vs. digital recordings] be linkable to the actually captured celluloid picture if movie material calibration models are incorporated for mapping the two (however, the development is then still an unknown variable that can be supplementary played with), but even without those, the digital recording can still yield very valuable side information, e.g. if it is geometrically co-registered with the celluloid captured view window, one can define regions, and apart from the celluloid captured developed grain values one can code e.g. linear actual scene view values via the digital capturing), because the skilled person will understand how to transpose these components to the room of a color grader, or a transcoder doing the same for e.g. an old Laurel and Hardy picture.

FIG. 12 show attached to camera 1201, a digital display 1203 (which e.g. gets a feed from a CCD co-registered with the camera lens). However the connection 1204 need not be fixed but can also be a transmitter for a number of separate displays (e.g. one for the camera operator and one in the overview stack of the director). Upon the display 1203 the camera operator or director of photography can draw e.g. a region 1250 which they know they have calibrated with their stage lighting as a dark part of the image, which can be done with e.g. a light pen 1208 or other user interface input means

[we show only one example, because we think the skilled person can well understand which types of system allow a user to give feedback on a displayed image]. The display 1203 may store added information onto a memory 1206 (e.g. a detachable memory stick), or communicate via a transmission system 1205. It can also receive further information from an in-filming-situ scene analysis device 1220 (which may simply be a light meter or even a spatially sampling spectrometer), via its transmission system 1221, which may also transmit to the final data accumulation place (i.e. 1240). Furthermore, in-scene meters 1230 (i.e. local illumination meters to measure how actor's faces are illuminated, especially when with highly variable lighting; sphere systems looking at the surrounding illumination distribution; etc.) may transmit their data to any part of the system via their transmission system 1231. The receiving display can then try to reproduce the light in its original brightness, or at least a fraction (or function) thereof, typically in accordance with some psycho-visual model for creating a similar look (typically coordinating the looks of the different color rendering regimes). All data is accumulated on a data accumulation apparatus 1240 with on-board memory, typically a computer (with transmission system 1241).

Not all components need be present. However, as the skilled person understands, the system can be expanded with apparatuses to analyze the entire environment in detail, which is not only useful for contemporary computer graphics effects insertion, but both the final living room display rendering and ambient lighting will benefit if more details of the scene as to both its reflecting objects and the actual illumination are co-recorded with the final image signal (this allows better relighting to become more in-tune with the viewer's environment).

The system illustrated in FIG. 12 may thus be used by an operator to generate an LDR image by manual colour grading/tone mapping. The resulting LDR image can then be encoded and represented in the first pixel picture. The system may further automatically determine parameters for generating the HDR image. Alternatively, the operator may also use the system of FIG. 12 to generate the HDR extension data, e.g. by a semi-automated process.

Figure 13:
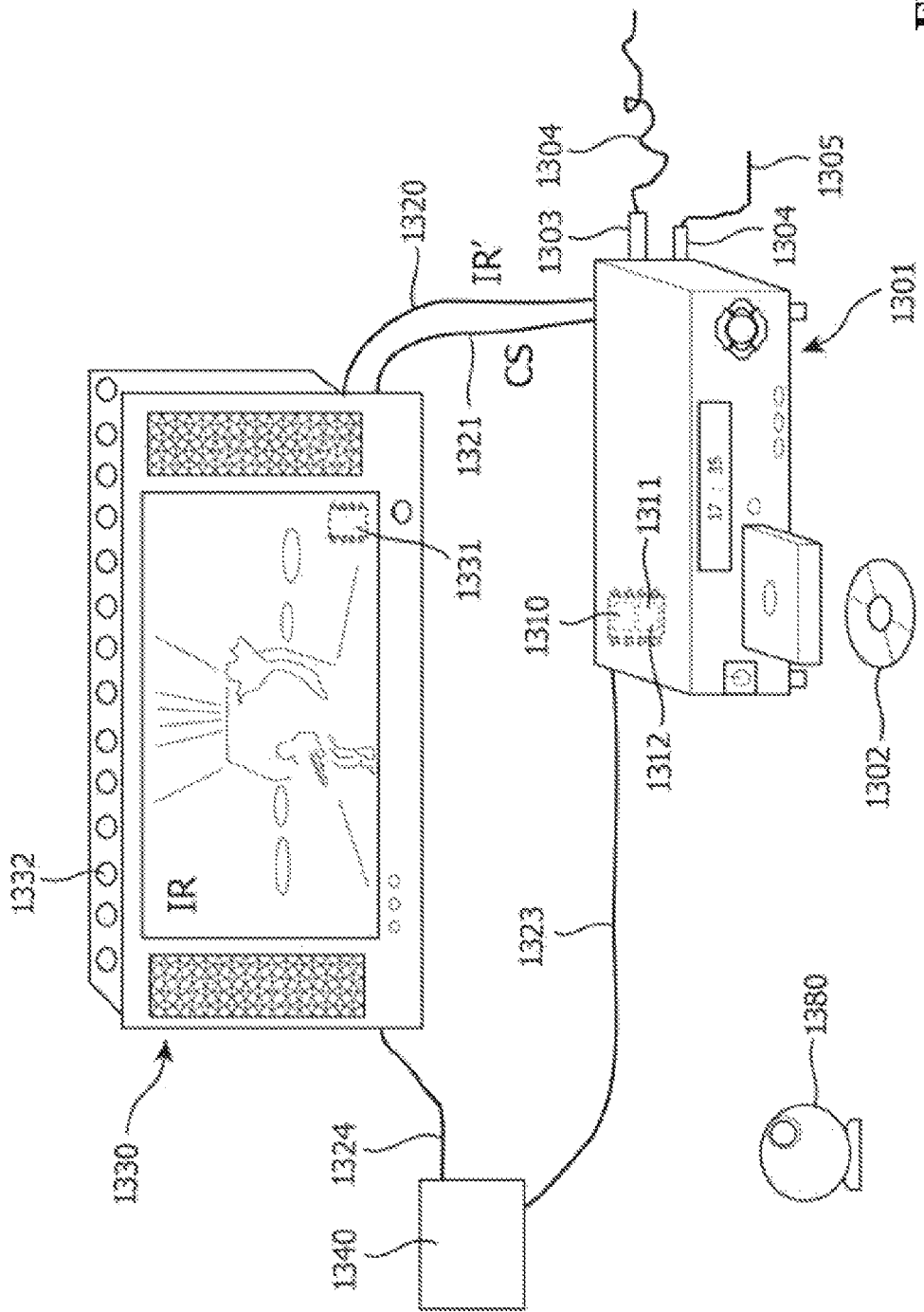
FIG. 13 illustrates an example of a system for processing audiovisual content.

FIG. 13 shows an exemplary image decoding and displaying system at the receiving side, e.g. in a consumer's living room (the skilled person will understand how a similar system according to principles of our invention will look in e.g. a digital cinema theatre). An embodiment of color rendering image processing apparatus 1301 is a set top box (which may correspond to the content processing device 103 of FIG. 1) with built-in Blu-ray reader (but this may also be e.g. a laptop computer, or portable device like a mobile phone etc., i.e. the apparatus 1301 can be as small as a plug-in card or as big as a professional cinema transcoding studio) is able to receive a Blu-ray 1302 with the entire LDR/HDR extension image signal encoded on it, i.e. both the first picture with the LDR and the second picture with HDR extension data included.

The apparatus may as another example received the signals via a first connection 1303 to e.g. a television signal transmission cable (or antenna, or input for digital photos on a memory card, etc.; image signal may also variously mean e.g. a television standard encoded signal, or a raw image file etc.) 1304 which carries the (typically compression encoded) input signals. In some embodiments the two pictures could be provided via two paths, e.g. the HDR description data may come over another medium via a second connector 1304 e.g. connected to the internet 1305.

The apparatus 1301 has an IC which has at least an extractor 1311 arranged to extract the data, and either output it directly or convert it to new values more suitable for doing controlled image processing by an image processing unit 1312. This may be embodied so simple as to only apply some tone reproduction transformations to the pixels corresponding to the special to be rendered regime, or have complex algorithms, e.g. typically corresponding to any of the algorithms that can be applied at the creation side, e.g. a segmentation and/or tracking algorithm/unit.

The player 1301 may output its improved intended rendering output image IR' to the display/television over a video cable 1320 (e.g. HDMI), but since the television may do (or be requested to do) additional processing (on its image analysis and/or processing IC 1331), a second connection (cable or wireless) 1321 may be present for control signals CS (which may comprise any data from the signal and/or control data derived therefrom). Typically these additional control signals may be added over the video cable, by updating e.g. the (wireless) HDMI protocol. The apparatus 1323 may also send color signals over connection 1323 to a second, environment color display 1340, which may also obtain its intended rendering color input signals via the display 1330. The exemplary display is with a LED backlight 1332, ideal for HDR rendering. Environment measurement devices like measurement device 1380 may be present e.g. a cheap camera which can check the surround of the television, lights in the room, reflections on the television front plate, visibility of calibration grey scales, etc., and they may communicate this information to apparatus 1301 and/or display 1330.

The algorithmic components disclosed in this text may (entirely or in part) be realized in practice as hardware (e.g. parts of an application specific IC) or as software running on a special digital signal processor, or a generic processor, etc.

It should be understandable to the skilled person from our presentation which components may be optional improvements and can be realized in combination with other components, and how (optional) steps of methods correspond to respective means of apparatuses, and vice versa. The word "apparatus" in this application is used in its broadest sense, namely a group of means allowing the realization of a particular objective, and can hence e.g. be (a small part of) an IC, or a dedicated appliance (such as an appliance with a display), or part of a networked system, etc. "Arrangement" is also intended to be used in the broadest sense, so it may comprise inter alia a single apparatus, a part of an apparatus, a collection of (parts of) cooperating apparatuses, etc.

The computer program product denotation should be understood to encompass any physical realization of a collection of commands enabling a generic or special purpose processor, after a series of loading steps (which may include intermediate conversion steps, such as translation to an intermediate language, and a final processor language) to enter the commands into the processor, and to execute any of the characteristic functions of an invention. In particular, the computer program product may be realized as data on a carrier such as e.g. a disk or tape, data present in a memory, data traveling via a network connection—wired or wireless—, or program code on paper. Apart from program code, characteristic data required for the program may also be embodied as a computer program product. Some of the steps required for the operation of the method may be already present in the functionality of the processor instead of described in the computer program product, such as data input and output steps.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Additionally, although a feature may appear to be described in connection with particular embodiments, one skilled in the art would recognize that various features of the described embodiments may be combined in accordance with the invention. In the claims, the term comprising does not exclude the presence of other elements or steps. It should be understood by the skilled person that combinations described for methods may have similar versions for apparatuses or other claim categories, like signals, whether derived or by themselves. Also it may be understood that various embodiment options may be combined or eliminated in various versions in manifold ways, still following the teachings elucidated by examples in this document.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A method of generating an image signal of a representation of a captured physical scene, the method comprising:
providing, in the image signal, a first pixelised picture encoding and a second pixelised picture encoding, each pixelised picture encoding having a luminance component and a color component represented by sets of code words of a number N of bits, corresponding to a two-dimensional array of pixel positions;
encoding a first image of the captured physical scene with luminance and color code words in the first pixelised picture encoding;
encoding dynamic range extension data in the color component of the second pixelised picture encoding in lieu of color values, the dynamic range extension data corresponding to at least one region of pixels in the first image and representing a dynamic range extension transformation in the luminance component to obtain an increased dynamic range image based on the first pixelised picture, wherein the dynamic range extension data includes the luminance transformation or a modification of the luminance transformation.

2. The method of claim 1, in which the encoding of the dynamic range extension data in the color component of the second pixelised picture encoding further comprises dynamic range extension compensation data to further modify the increased dynamic range image.

3. The method of claim 2, further comprising including dynamic range extension data in the luminance component of the second pixelised picture encoding, the dynamic range extension data representing a second dynamic range extension transform.

4. The method of claim 2, wherein the dynamic range extension compensation data comprises pixel error correction values for pixel positions of the first image.

5. The method of claim 4, wherein the pixel error correction values are indicative of a weighted difference between image pixel values of the second increased dynamic range image and image pixel values of a corresponding input high dynamic range image.

6. The method of claim 2, further comprising generating the dynamic range extension compensation data in response to a comparison of the increased dynamic range image and a corresponding input high dynamic range image.

7. The method of claim 2, wherein the dynamic range extension compensation data comprises color saturation compensation data.

8. The method of claim 2, wherein the first image is a first geometrical view image of a scene, and the method further comprises:
including image encoding data for a second image in the second pixelised picture encoding, the second image being a second geometrical view image of the captured physical scene.

9. The method of claim 8, wherein for at least some time instants only one of the second geometrical view image and the dynamic range extension data is comprised in the second pixelised picture encoding; and the method further comprises:
including in the image coding signal an indication of whether the second pixelised picture encoding comprises the second geometrical view image or the dynamic range compensation data.

10. The method of claim 8, wherein the image encoding data for the encoded second geometrical view image is included in the luminance component of the second pixelised picture encoding, and the dynamic range compensation data is included in the color component of the second pixelised picture encoding.

11. The method of claim 1, further comprising applying a prediction function to implement the luminance transformation.

12. The method of claim 2, further comprising including further dynamic range extension compensation data in a further color component of the second pixelised picture encoding, the further dynamic range extension compensation data comprising data representing a second compensation for the increased dynamic range image.

13. The method of claim 1, wherein the dynamic range extension data comprises pre-compensation data for applying to the first image decoded from the first pixelised picture encoding prior to applying the luminance transformation.

14. The method of claim 1, wherein the image coding signal is compatible with at least one of a High-Definition Multimedia Interface and a DisplayPort video interface standard.

15. An apparatus for generating an image coding signal, the apparatus comprising:
   a memory;
   at least one processor configured to:
      generate a first pixelised picture encoding and a second pixelised picture encoding from a first image, each pixelised picture encoding having a luminance component and a color component;
      include image encoding data for the first image in the first pixelised picture encoding;
      include dynamic range extension data in the color component of the second pixelised picture in lieu of color values, the dynamic range extension data corresponding to at least one region of pixels in the first image and comprising data representing luminance transformation; and
      transform a luminance of the first image to obtain an increased dynamic range image, wherein the dynamic range extension data includes the luminance transformation or a modification of the luminance transformation.

16. A method of generating an increased dynamic range image, the method comprising:
   receiving an image coding signal comprising a first pixelised picture encoding and a second pixelised picture encoding, each pixelised picture encoding having a luminance component and a color component, the image coding signal comprising image encoding data for a first image in the first pixelised picture encoding, and dynamic range extension data without color encoding data in the color component of the second pixelised picture encoding, the dynamic range extension data encoding for at least one region of pixels a transformation in a luminance component of the first image into an increased dynamic range image, the dynamic range extension data including the luminance transformation or a modification of the luminance transformation;
   generating the first image from the image encoding data of the first image in the first pixelised picture encoding;
   determining a dynamic range extension transformation process based on the dynamic range extension data; and
   applying the dynamic range extension transformation process to the first image to generate an enhanced dynamic range image.

17. An apparatus for generating an increased dynamic range image, the apparatus comprising:
   a receiver;
   at least one processor configured to:
      receive, via the receiver, an image coding signal comprising a first pixelised picture encoding and a second pixelised picture encoding, each pixelised picture encoding having a luminance component and a color component, the image coding signal comprising image encoding data for a first image in the first pixelised picture encoding, and dynamic range extension data without color encoding data in the color component of the second pixelised picture encoding, the dynamic range extension data comprising data representing a luminance transformation of at least one region of pixels in the first image into an increased dynamic range image of the first image the dynamic range extension data including the luminance transformation or a modification of the luminance transformation;
   generate a lower dynamic range image from the image encoding data for the first image in the first pixelised picture encoding; and
   apply the luminance transformation, based on the dynamic range extension data, to the first image to generate the increased dynamic range image.

* * * * *